(12) United States Patent
Hayashi et al.

(10) Patent No.: US 11,755,089 B2
(45) Date of Patent: Sep. 12, 2023

(54) INFORMATION PROCESSING APPARATUS, ELECTRIC POWER TRANSFER SYSTEM, CONTROL METHOD OF INFORMATION PROCESSING APPARATUS, AND NON-TRANSITORY COMPUTER-READABLE STORAGE MEDIUM

(71) Applicant: BROTHER KOGYO KABUSHIKI KAISHA, Nagoya (JP)

(72) Inventors: Seigo Hayashi, Nagoya (JP); Hajime Usami, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/086,331

(22) Filed: Oct. 31, 2020

(65) Prior Publication Data

US 2021/0132673 A1    May 6, 2021

(30) Foreign Application Priority Data

Oct. 31, 2019   (JP) .................................. 2019-198260

(51) Int. Cl.
*G06F 1/26* (2006.01)
*H02H 3/00* (2006.01)
(Continued)

(52) U.S. Cl.
CPC ................ *G06F 1/266* (2013.01); *G06F 1/28* (2013.01); *G06F 1/30* (2013.01); *G06F 11/3058* (2013.01);
(Continued)

(58) Field of Classification Search
CPC ... G06F 1/266; G06F 1/28; G06F 1/30; G06F 1/3206; G06F 11/1458; G06F 11/3058;
(Continued)

(56) References Cited

U.S. PATENT DOCUMENTS 4,847,720 A  *  7/1989  Dezonno ................... H02H 3/04
                                                    361/18
10,346,072 B1 *  7/2019  Peterson ................. G11C 5/144
(Continued)

FOREIGN PATENT DOCUMENTS

JP       2011-070445 A    4/2011
JP       2016-13024 A     1/2016
(Continued)

OTHER PUBLICATIONS

"Unversal Serial Bus Power Delivery Specification". Revision 3.0. Version 1.1. Jan. 12, 2017. Apple Inc. et al. (Year: 2017).*
(Continued)

*Primary Examiner* — Thomas J. Cleary
(74) *Attorney, Agent, or Firm* — Kenealy Vaidya LLP

(57) ABSTRACT

An information processing apparatus includes a power processor, an interface, a detector that detects at least one of a voltage value and a current value on an electric power line that connects the power processor and the interface, and a controller. The controller transmits warning information to an external device via the interface in a case where a detection value of the detector indicates an abnormal value while electric power is supplied to the external device via the interface.

16 Claims, 10 Drawing Sheets

(51) Int. Cl.
  *G06F 1/30*    (2006.01)
  *G06F 13/42*   (2006.01)
  *G06F 1/28*    (2006.01)
  *G06F 11/30*   (2006.01)
  *H04N 1/00*    (2006.01)

(52) U.S. Cl.
  CPC ........... *G06F 13/4282* (2013.01); *H02H 3/00* (2013.01); *G06F 2213/0042* (2013.01); *H04N 1/00888* (2013.01); *H04N 1/00899* (2013.01)

(58) Field of Classification Search
  CPC ............ G06F 13/4282; H04N 1/00888; H04N 1/00899
  See application file for complete search history.

(56) References Cited

U.S. PATENT DOCUMENTS

| | | | | |
|---|---|---|---|---|
| 2009/0327536 | A1* | 12/2009 | Solomon | G06F 13/42 710/63 |
| 2011/0078481 | A1  | 3/2011  | Noda | |
| 2015/0355696 | A1* | 12/2015 | Pamley | G06F 13/4221 713/300 |
| 2015/0380924 | A1  | 12/2015 | Ohwaki | |
| 2016/0054786 | A1* | 2/2016  | Chenault | G06F 1/3287 710/313 |
| 2017/0346411 | A1* | 11/2017 | Yao | H02M 3/33576 |
| 2018/0097378 | A1* | 4/2018  | Card | G01R 31/3842 |
| 2018/0115237 | A1* | 4/2018  | Morin | H02J 13/00016 |
| 2018/0248356 | A1* | 8/2018  | Klein | G06F 13/4282 |
| 2018/0284866 | A1* | 10/2018 | Sakai | H04N 1/00885 |
| 2018/0287366 | A1* | 10/2018 | Yeh | H02H 3/00 |
| 2018/0287375 | A1* | 10/2018 | Su | H02H 1/0084 |
| 2020/0358354 | A1* | 11/2020 | You | H02M 1/08 |
| 2021/0135476 | A1* | 5/2021  | Shimamura | H02J 7/007182 |
| 2021/0135477 | A1* | 5/2021  | Hayashi | G03G 15/5004 |

FOREIGN PATENT DOCUMENTS

| | | |
|---|---|---|
| JP | 2016-72685 A  | 5/2016 |
| JP | 2016-189179 A | 11/2016 |
| JP | 2019-519837 A | 7/2019 |
| WO | 2017-189852 A1 | 11/2017 |

OTHER PUBLICATIONS

Japanese Office Action for the related Japanese Patent Application No. 2019-198260 dated Jul. 25, 2023.

* cited by examiner

INFORMATION PROCESSING APPARATUS, ELECTRIC POWER TRANSFER SYSTEM, CONTROL METHOD OF INFORMATION PROCESSING APPARATUS, AND NON-TRANSITORY COMPUTER-READABLE STORAGE MEDIUM

CROSS-REFERENCE TO RELATED APPLICATION

This application is based upon and claims the benefit of priority from prior Japanese patent application No. 2019-198260, filed on Oct. 31, 2019, the entire contents of which are incorporated herein by reference.

TECHNICAL FIELD

The present disclosure relates to an information processing apparatus that supplies electric power to an external device, an electric power transfer system, a control method of the information processing apparatus, and a non-transitory computer-readable storage medium storing a computer program executed by a computer mounted on the information processing apparatus.

BACKGROUND

In the related art, an information processing apparatus which supplies electric power to an external device via an interface is suggested. For example, JP-A-2016-13024 discloses an overcurrent detection circuit which monitors a current value of current supplied by a current monitoring unit in a case of supplying electric power from a USB port of USB PD (USB Power Delivery) standards to an external device. When a detected current value exceeds a threshold value, the overcurrent detection circuit turns off a switch connected to a Vbus and stops the supply of electric power from the USB port to the external device.

JP-A-2016-72685 discloses an image forming apparatus in which a Vbus switch is connected between a power supply and a USB port. The Vbus switch stops the supply of electric power to the USB port when it is detected that overcurrent flows.

SUMMARY

In the overcurrent detection circuit disclosed in JP-A-2016-13024 and the image forming apparatus disclosed in JP-A-2016-72685, when overcurrent is detected while supplying electric power, the supply of electric power is stopped. For this reason, the supply of electric power to a device that is an electric power sink may be stopped one-sidedly while the device receives electric power. As a result, an electronic device in the device that is an electric power sink or an electronic device connected to an outside may break down.

An object of the present disclosure is to provide an information processing apparatus that enables to suppress an occurrence of breakdown of an electronic device on an electric power sink-side in a case where a supply of electric power stops due to an electric power abnormality occurring in a device being an electric power source, an electric power transfer system, a control method of the information processing apparatus, and a non-transitory computer-readable storage medium storing a computer program executed by a computer mounted on the information processing apparatus.

A first aspect of the present disclosure is an information processing apparatus including:
a power processor;
an interface;
a detector configured to detect at least one of a voltage value and a current value on an electric power line that connects the power processor and the interface; and
a controller configured to transmit warning information to an external device via the interface in a case where a detection value of the detector indicates an abnormal value while electric power is supplied to the external device via the interface.

A second aspect of the present disclosure is an information processing apparatus including:
an interface; and
a controller configured to execute at least one of prohibition of writing into a storage device and a halt of the storage device in a case where warning information indicating an electric power abnormality of an external device is received from the external device while electric power is received from the external device via the interface.

A third aspect of the present disclosure is an electric power transfer system including:
a first information processing apparatus; and
a second information processing apparatus,
in which the first information processing apparatus includes:
a power processor;
a first interface;
a detector configured to detect at least one of a voltage value and a current value on an electric power line that connects the power processor and the first interface; and
a first controller,
the second information processing apparatus includes:
a second interface; and
a second controller,
the first controller transmits warning information to the second information processing apparatus via the first interface in a case where a detection value of the detector indicates an abnormal value while electric power is supplied to the second information processing apparatus via the first interface, and
the second controller executes at least one of prohibition of writing into a storage device and a halt of the storage device in a case where the warning information is received from the first information processing apparatus while electric power is received from the first information processing apparatus via the second interface.

The contents of the above aspects of the present disclosure can be implemented not only as the information processing apparatus or the electric power transfer system but also as a control method of controlling the information processing apparatus and a non-transitory computer-readable storage medium storing a computer program that is executed by a computer mounted on the information processing apparatus.

A fourth aspect of the present disclosure is a control method of an information processing apparatus including:
a power processor;
an interface; and
a detector configured to detect at least one of a voltage value and a current value on an electric power line that connects the power processor and the interface,
the control method including the step of:
transmitting warning information to an external device via the interface in a case where a detection value of the detector indicates an abnormal value while electric power is supplied to the external device via the interface.

A fifth aspect of the present disclosure is a control method of an information processing apparatus including an interface, including the step of:

executing at least one of prohibition of writing into a storage device and a halt of the storage device in a case where warning information indicating an electric power abnormality of an external device is received from the external device while electric power is received from the external device via the interface.

A sixth fourth aspect of the present disclosure is a non-transitory computer-readable storage medium storing a computer program, when executed by a computer mounted on an information processing apparatus including:

a power processor;
an interface; and
a detector configured to detect at least one of a voltage value and a current value on an electric power line that connects the power processor and the interface, the computer program being configured to cause the information processing apparatus to:

transmit warning information to an external device via the interface in a case where a detection value of the detector indicates an abnormal value while electric power is supplied to the external device via the interface.

A seventh fourth aspect of the present disclosure is a non-transitory computer-readable storage medium storing a computer program, when executed by a computer mounted on an information processing apparatus including an interface, the computer program being configured to cause the information processing apparatus to:

execute at least one of prohibition of writing into a storage device and a halt of the storage device in a case where warning information indicating an electric power abnormality of an external device is received from the external device while electric power is received from the external device via the interface.

According to the information processing apparatus, the electric power transfer system, the control method of the information processing apparatus and the non-transitory computer-readable storage medium storing the computer program of the present disclosure, when the device being the electric power source detects an electric power abnormality, the warning information is transmitted to the device being the electric power sink. Therefore, the device being the electric power sink can receive the warning information before the supply of electric power is stopped, and can implement in advance the appropriate handling such as the prohibition of writing into the storage device, the halt of the storage device, and the like. As a result, it is possible to suppress an occurrence of breakdown of the electronic device on the electric power sink-side.

DETAILED DESCRIPTION

Hereinbelow, a portable printer 1 that is a first embodiment of the information processing apparatus of the present disclosure will be described with reference to FIG. 1.

(1. Configuration of Portable Printer)

Figure 1:
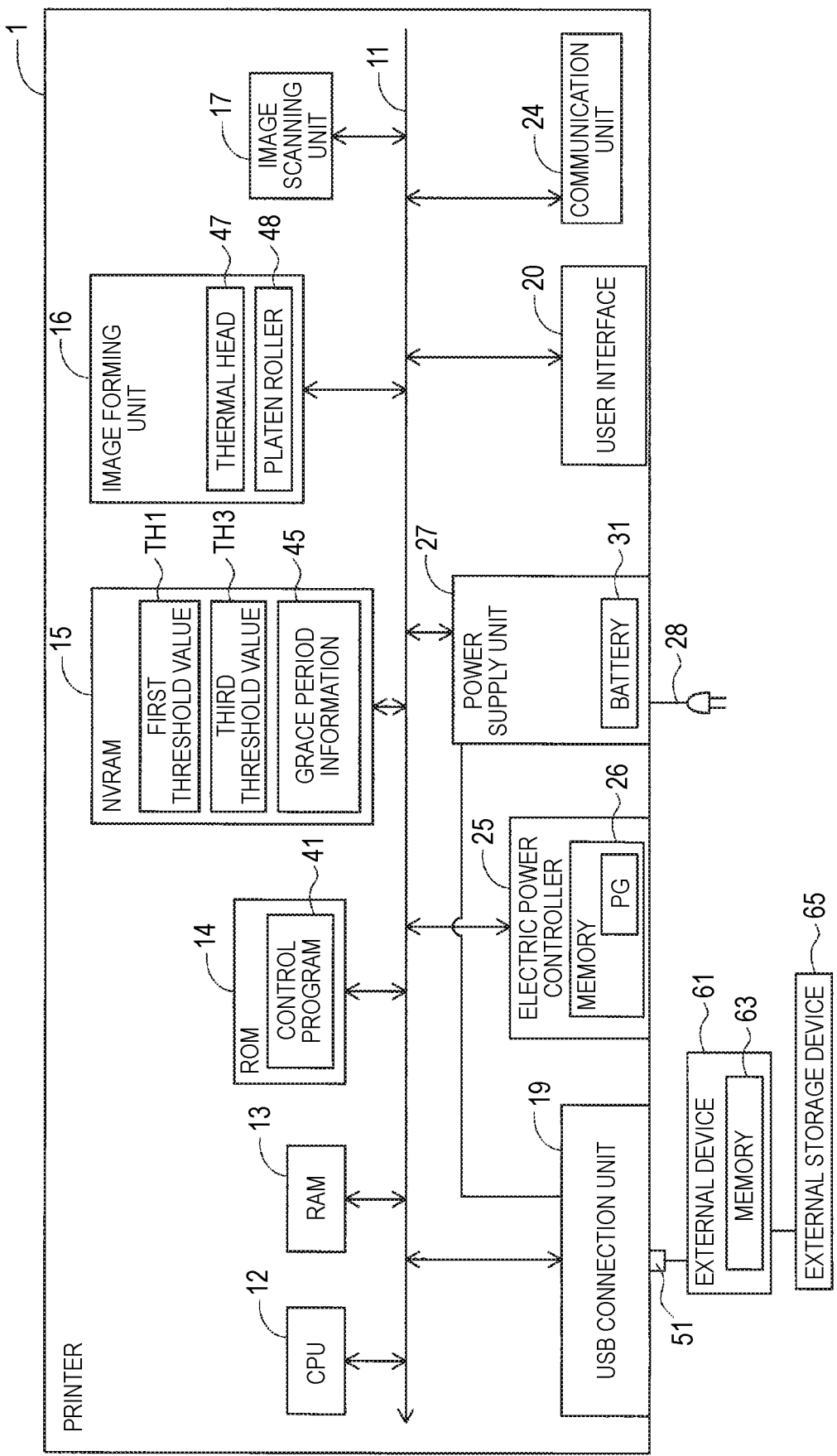
FIG. 1 is a block diagram depicting an electrical configuration of a printer in accordance with a first embodiment.

FIG. 1 depicts an electrical configuration of a portable printer 1 in accordance with the first embodiment. The printer 1 is, for example, a portable printing device. The printer 1 prints image data of a print job received from a PC, a smartphone or the like via wired communication or wireless communication on a predetermined sheet (thermal paper), for example. The printer 1 includes a CPU 12, a RAM 13, a ROM 14, an NVRAM 15, an image forming unit 16, an image scanning unit 17, a USB (Universal Serial Bus) connection unit 19, a user interface 20, a communication unit 24, an electric power controller 25, a power supply unit 27, and the like. The CPU 12 and the like are connected to each other via a bus 11. The CPU 12 and the electric power controller 25 are a computer functioning as a controller of the printer 1.

The ROM 14 is a non-volatile memory such as a flash memory, for example, and stores therein a variety of programs such as a control program 41. For example, the CPU 12 executes the control program 41 read out from the ROM 14, thereby activating a system of the printer 1. In the meantime, the data storage destination is an example. For example, the control program 41 may also be stored in the NVRAM 15. The storage unit in which the control program 41 is stored may be a computer-readable storage medium. As the computer-readable storage medium, a recording medium such as a CD-ROM and a DVD-ROM may also be adopted, in addition to the above example.

The control program 41 is firmware for collectively controlling each unit of the printer 1, for example. The CPU 12 controls each unit connected with the bus 11 while executing the control program 41 and temporarily storing a result of executed processing in the RAM 13. In descriptions below, the CPU 12 executing the control program 41 may also be simply described as the CPU 12. For example, the description "the CPU 12" may mean "the CPU 12 that executes the control program 41".

The NVRAM 15 is a non-volatile memory. The NVRAM 15 stores a first threshold value TH1, a third threshold value TH3 and grace period information 45. The first threshold value TH1 is, for example, a threshold value that is used for comparison with a voltage value detected by a first voltage detection circuit 34, which will be described later. The third threshold value TH3 is, for example, a threshold value that is used for comparison with a voltage value detected by an AC supply monitoring circuit 36, which will be described later. The grace period information 45 is information about a grace period of time to stop the supply of electric power when an electric power abnormality is detected. The processing using the grace period information 45 will be described in detail later.

The image forming unit 16 includes a line-type thermal head 47, for example, and prints an image on a sheet by a direct thermal method under control of the CPU 12. The image forming unit 16 conveys the sheet by rotating a platen roller 48 provided to face the thermal head 47. For example, upon start of printing, when a sheet is inserted into an insertion opening of the printer 1, the inserted sheet is guided to a facing part between the platen roller 48 and the thermal head 47 and is discharged from a discharge opening after the printing is completed.

The configuration of the image forming unit 16 is an example. The image forming unit 16 may include a toner cartridge, a photosensitive drum, a developing roller, an exposure device and the like, and may execute the printing by an electrophotographic method. Alternatively, the image forming unit 16 may include an inkjet head, an ink cartridge and the like, and may execute the printing by an inkjet method, for example.

The image scanning unit 17 includes a document platen (not shown) and an image sensor such as a CIS (Contact Image Sensor), a CCD (Charge-Coupled Device) and the like. The image scanning unit 17 moves the CIS and the like relative to a document placed on the document platen, scans the document to generate image data, and stores the image data in the RAM 13.

The USB connection unit 19 is an interface which performs communication and electric power transfer that comply with USB PD (USB Power Delivery) standards, for example. The USB connection unit 19 includes a receptacle 51 as a connector. The USB connection unit 19 performs data communication and electric power transfer with a variety of external devices 61 connected to the receptacle 51. In FIG. 1, as an example, one external device 61 is connected to one receptacle 51. As the external device, for example, a variety of devices that can connect based on USB standards, such as a smartphone, a personal computer, a laptop PC, a printer, an external hard disk, a USB memory, a card reader, and the like may be adopted. In the meantime, the USB connection unit 19 may include a plurality of the receptacles 51. As shown in FIG. 1, the external device 61 includes an embedded memory 63 and an external storage device 65. The memory 63 is, for example, a RAM, a ROM, an HDD, and the like. As described later, in a case where an external device having the same configuration as the printer 1 is adopted as the external device 61, the memory 63 corresponds to the RAM 13, the ROM 14, and the NVRAM 15. The external storage device 65 is, for example, a USB connection-type HDD, a USB memory, an SD card and the like.

The receptacle 51 is, for example, a connector that complies with USB Type-C standards. The receptacle 51 has a plurality of signal lines for performing data communication and electric power transfer. For example, the receptacle 51 has, as the plurality of signal lines, a TX signal line, an RX signal line, a D signal line, a Vbus signal line, a CC signal line, a ground signal line and the like in the connector of USB Type-C standards. In the meantime, the signal line may also be referred to as a pin. The receptacle 51 performs data communication by using any one of the TX signal line, the RX signal line and the D signal line, for example. The D signal line is, for example, a Data signal line and indicates D+/D−. The receptacle 51 performs a supply of electric power and a reception of electric power by using the Vbus signal line.

The CC signal line is a signal line that is used so as to decide an electric power role, for example, and includes a CC1 signal line and a CC2 signal line, in correspondence to the front and back of a plug connected to the receptacle 51. The CC signal line is also used as a signal line of communication relating to device management, such as an alert message. The receptacle 51 has a dual role power (DRP) function capable of switching to an electric power source that is an electric power role for supplying electric power or an electric power sink that is an electric power role for receiving electric power.

The electric power controller 25 controls supply and reception of electric power, and transmission and reception of data via the USB connection unit 19. The electric power controller 25 decides an electric power role, based on a connection state of the CC signal line (a potential of the CC signal line, and the like) at the time when an external device is connected to the receptacle 51, and to execute negotiation of electric power transfer. As used herein, the negotiation is processing of setting an electric power source or an electric power sink, setting electric power transfer, and the like, for example.

The electric power controller 25 executes negotiation of setting a supply electric power W (refer to FIG. 2) supplied through the Vbus signal line for the receptacle 51 functioning as an electric power source, for example. The electric power controller 25 transmits the external device 61 an electric power list of the supply electric power (thereafter, referred to "supply electric power") W based on the control of the CPU 12, for example. As used herein, the electric power list is information indicating a combination of a voltage value of a supply voltage Vs (refer to FIG. 2) and a current value of a supply current As (refer to FIG. 2), which can be supplied by the printer 1 as an electric power source. The electric power list can be referred to as a profile. The combination of the voltage value and the current value can also be referred to as a PDO (Power Data Object), For example, in electric power transfer that complies with USB PD standards, electric power can be supplied from an electric power source to an electric power sink within a range of electric power from 2.5 W (5V, 0.5 A) to 100 W (20V, 5 A). The electric power list is information indicating a combination (PDO) of the voltage value and the current value within the range of electric power, which can be supplied by the printer 1 functioning as an electric power source.

When the receptacle 51 is caused to function as an electric power sink, the electric power controller 25 executes negotiation with respect of reception of electric power via the receptacle 51. The electric power controller 25 requests a combination of a voltage value and a current value that are to be received from the electric power list received from the external device 61 functioning as an electric power source, under control of the CPU 12, for example. When the negotiation is successful, the receptacle 51 receives desired electric power from the external device 61.

As shown in FIG. 1, the electric power controller 25 includes a memory 26. In the memory 26, a program PG is stored. The electric power controller 25 includes a processing circuit such as a CPU, and executes the program PG in the processing circuit, thereby controlling the power supply unit 27, for example. The memory 26 is configured by a combination of a RAM, a ROM, a flash memory and the like, for example.

The power supply unit 27 functions as a power supply for each unit in the printer 1 to supply electric power to each unit. The power supply unit 27 will be described in detail later. The user interface 20 is, for example, a touch panel, and includes a liquid crystal panel, a light source such as LED for irradiating light from a backside of the liquid crystal panel, a touch detection film bonded on a surface of the liquid crystal panel, and the like. The user interface 20 receives an operation on the printer 1 and to output a signal corresponding to an operation input to the CPU 12. The user interface 20 displays information about the printer 1. The user interface 20 changes display contents of the liquid crystal panel, under control of the CPU 12. In the meantime, the user interface 20 may also include operation buttons such as hard keys. The user interface 20 is not limited to the configuration where a display unit and an operation unit are integrated, such as a touch panel, and may also have a configuration where a display unit and an operation unit are separately provided.

The communication unit 24 can enable wired communication and wireless communication. The CPU 12 controls the communication unit 24 to receive a print job and a scan job via wired communication and wireless communication. Thereby, the printer 1 can receive a print job and a scan job via wired communication or wireless communication with a PC, a smartphone and the like, for example. The printer 1 can receive a print job and a scan job via data communication of the USB connection unit 19. The CPU 12 executes printing by the image forming unit 16, based on the received print job. The CPU 12 executes scanning of an image by the image scanning unit 17, based on the received scan job. The CPU 12 receives a print job and a scan job and to execute printing and scanning, based on operation inputs on the user interface 20.

(2. Configuration of Power Supply Unit 27)

Figure 2:
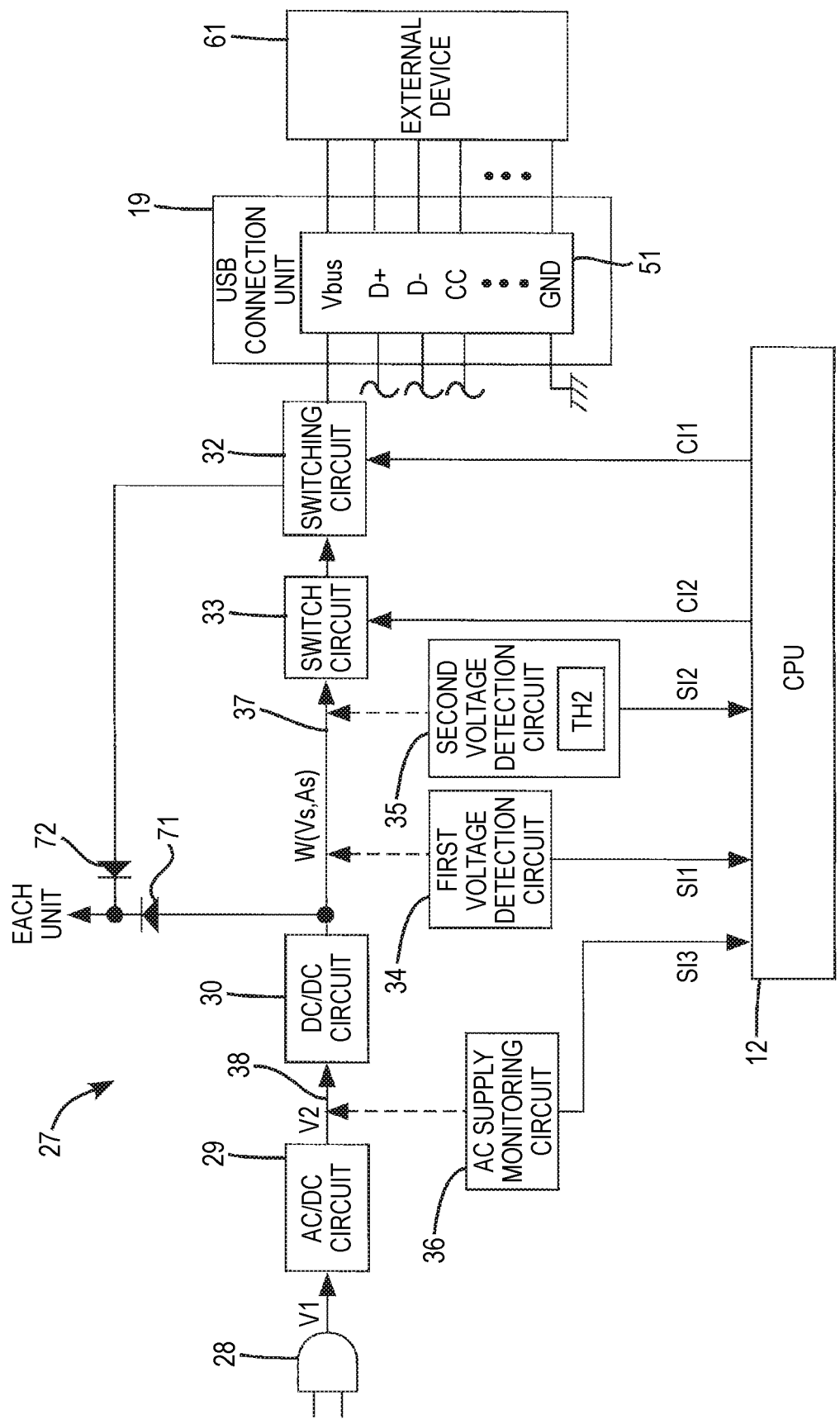
FIG. 2 is a block diagram depicting a configuration of a power supply unit in accordance with the first embodiment.

Subsequently, the power supply unit 27 is described in detail. FIG. 2 depicts a configuration of the power supply unit 27. As shown in FIGS. 1 and 2, the power supply unit 27 includes a power supply cord 28, an AC/DC circuit 29, a DC/DC circuit 30, a battery 31 (refer to FIG. 1), a switching circuit 32, a switch circuit 33, a first voltage detection circuit 34, a second voltage detection circuit 35, an AC supply monitoring circuit 36, and the like. The AC/DC circuit 29 and the DC/DC circuit 30 function as a power processor. The AC/DC circuit 29 converts an AC voltage V1, which is received from an AC power supply via the power supply cord 28, into a DC voltage V2. A voltage value of the AC voltage V1 is, for example, 100V. A voltage value of the DC voltage V2 is, for example, 25V.

The DC/DC circuit 30 is connected to each unit in the printer 1 via a diode 71, and supplies electric power to each unit in the printer 1. The DC/DC circuit 30 is connected to the AC/DC circuit 29 via an electric power line 38, and converts the DC voltage V2 supplied from the AC/DC circuit 29 via the electric power line 38 or a DC voltage supplied from the battery 31 (refer to FIG. 1) into a DC voltage of a desired voltage value, and to supply electric power to each unit in the printer 1. Therefore, the printer 1 can be driven by the battery 31 even when the AC power supply is not connected thereto. The battery 31 can be charged by electric power generated from the AC/DC circuit 29 or electric power received from an external device via the USB connection unit 19.

The DC/DC circuit 30 generates the supply electric power W (the supply voltage Vs, the supply current As), which is supplied from the USB connection unit 19 to the external device 61, from the DC voltage V2 and the like. The DC/DC circuit 30 is connected to the switch circuit 33 via an electric power line 37. The switch circuit 33 is connected to the Vbus signal line of the receptacle 51 of the USB connection unit 19. In other words, the switch circuit 33 and the switching circuit 32 are connected between the DC/DC circuit 30 and the USB connection unit 19.

The switching circuit 32 is a circuit which switches a direction of electric power via the USB connection unit 19. The switching circuit 32 has, for example, a plurality of FETs (Field effect transistor), and turns on/off the plurality of FETs, based on a control signal C11 input from the CPU 12, thereby switching electric power paths in the circuit. The switching circuit 32 is connected to each unit in the printer 1 via a diode 72. The switching circuit 32 switches a state (hereinbelow, also referred to as 'supply state') of connecting an electric power path for supplying electric power from the DC/DC circuit 30 to the external device 61 via the USB connection unit 19 and a state (hereinbelow, also referred to as 'electric power receiving state') of electing an electric power path for supplying electric power received from the external device 61 to each unit via the diode 72, based on the control signal C11. Therefore, the switching circuit 32 can switch a direction of electric power in the supply state and a direction of electric power in the electric power receiving state.

The switch circuit 33 switches connection between the DC/DC circuit 30 and the switching circuit 32 (USB connection unit 19), based on the control signal CI that is input from the CPU 12. The switch circuit 33 has, for example, a FET, and turns on/off the FET, based on the control signal C12, thereby switching an on state where the DC/DC circuit 30 is connected to the switching circuit 32 and an off state where the DC/DC circuit 30 and the switching circuit 32 are disconnected. The CPU 12 sets the switch circuit 33 to the on state after activating the power supply unit 27 and sets the switch circuit 33 to the off state when an electric power abnormality is detected, as described later.

In the meantime, the switching circuit 32 and the switch circuit 33 of the present disclosure are not limited to the configuration of switching the connection by using the FET, and may also switch the connection by using another transistor such as a bipolar transistor or to switch the connection by turning on or off physically a relay. The switching circuit 32 may be connected to an input terminal of the DC/DC circuit 30 via the diode 72 or may be connected to a DC/DC circuit other than the DC/DC circuit 30. The electric power received from the external device 61 may be converted via the switching circuit 32 and the DC/DC circuit 30, and may be then supplied to each unit. The switch circuit 33 is not limited to the configuration of connecting or disconnecting the electric power line 37, and may have a variable resistor and may switch the supply electric power W supplied from the USB connection unit 25 to the external device 61 by reducing the supply electric power W without completely stopping the supply of electric power. The subject controlling the switching circuit 32 and the switch circuit 33 is not limited to the CPU 12 and may also be the electric power controller 25.

The first voltage detection circuit 34 outputs, to the CPU 12, a first detection signal SI1 corresponding to a magnitude of the supply voltage Vs that flows through the electric power line 37. The second voltage detection circuit 35 outputs, to the CPU 12, a second detection signal SI2 corresponding to a magnitude of the supply voltage Vs that flows through the electric power line 37. The configurations of the first and second voltage detection circuits 34 and 35 are not particularly limited and may be identical or different from each other.

The configurations of the first and second voltage detection circuits 34 and 35 of the present embodiment are different from each other. The first voltage detection circuit 34 outputs information indicating a magnitude of the voltage value of the supply voltage Vs to the CPU 12, as the first detection signal SI1, based on a voltage applied to an internal resistor connected in parallel with the electric power line 37, for example. The CPU 12 determines an electric power abnormality of the supply electric power W by comparing the voltage value of the supply voltage Vs indicated by the first detection signal SI1 input from the first voltage detection circuit 34 with the first threshold value TH1 read out from the NVRAM 15. Therefore, in determination processing of determining an electric power abnormality by using the first threshold value TH1, the CPU 12 executes comparison process sing with the first threshold value TH1. The determination processing of determining an electric power abnormality by using the first threshold value TH1 will be described in detail later (S11 in FIG. 3).

A data format of the first detection signal SI1 is not particularly limited. For example, the first detection signal SI1 may be a bit value indicating the voltage value of the supply voltage Vs as a numerical value. The first detection signal SI1 may be a numerical value indicating stepwise a magnitude of the supply voltage Vs.

The second voltage detection circuit 35 compares the magnitude of the voltage value of the supply voltage Vs with a second threshold value TH2, based on a voltage applied to an internal resistor connected in parallel with the electric power line 37, and to output a result of the comparison to the CPU 12, as the second detection signal SI2, for example. Therefore, in determination processing of determining an electric power abnormality by using the second threshold value TH2, the second voltage detection circuit 35 executes the comparison processing with the second threshold value TH2. The determination processing of determining an electric power abnormality by using the second threshold value TH2 will be described in detail later (S11 in FIG. 3).

The AC supply monitoring circuit 36 outputs a third detection signal SI3 corresponding to a voltage value on the electric power line 38 for connecting the AC/DC circuit 29 and the DC/DC circuit 30 each other. The AC supply monitoring circuit 36 outputs information indicating a magnitude of the voltage value of the DC voltage V2 to the CPU 12, as the third detection signal SI3, based on a voltage applied to an internal resistor connected in parallel with the electric power line 38, for example. The CPU 12 determines an abnormality of the AC power supply by comparing the voltage value of the DC voltage V2 indicated by the third detection signal SI3 input from the AC supply monitoring circuit 36 with the third threshold value TH3 in the NVRAM 15. Therefore, in determination processing of determining an electric power abnormality of the AC power supply by using the third threshold value TH3, the CPU 12 executes comparison processing with the third threshold value TH3. The determination processing of determining an electric power abnormality by using the third threshold value TH3 will be described in detail later (S11 in FIG. 3). In the meantime, a data format of the third detection signal SI3 is not particularly limited. For example, the third detection signal SI3 may also be a bit value indicating the voltage value of the DC voltage V2 as a numerical value.

In the meantime, the connection configuration shown in FIG. 2 is an example. In FIG. 2, the connection of each circuit is simplified so as to avoid complication of the drawing. For example, the DC/DC circuit 30 and each unit in the printer 1 may also be connected to each other by a plurality of electric power lines (an electric power line for each voltage value, and the like). The electric power line for connecting the DC/DC circuit 30 and each unit each other and the electric power line 37 for connecting the DC/DC circuit 30 and the switch circuit 33 each other may also be separate electric power lines.

(3. Swap Request Transmission Processing)

Subsequently, swap request transmission processing of transmitting a swap request by the CPU 12 of the present embodiment is described with reference to FIG. 3. When the CPU 12 executes negotiation with the external device 61, functions as an electric power source as a result of the negotiation and starts the supply of electric power to the external device 61, for example, the CPU 12 starts the swap request transmission processing shown in FIG. 3. The CPU 12 executes the swap request transmission processing to transmit warning information or swap request to the external device 61 that is an electric power sink, based on occurrence of an electric power abnormality.

Figure 3:
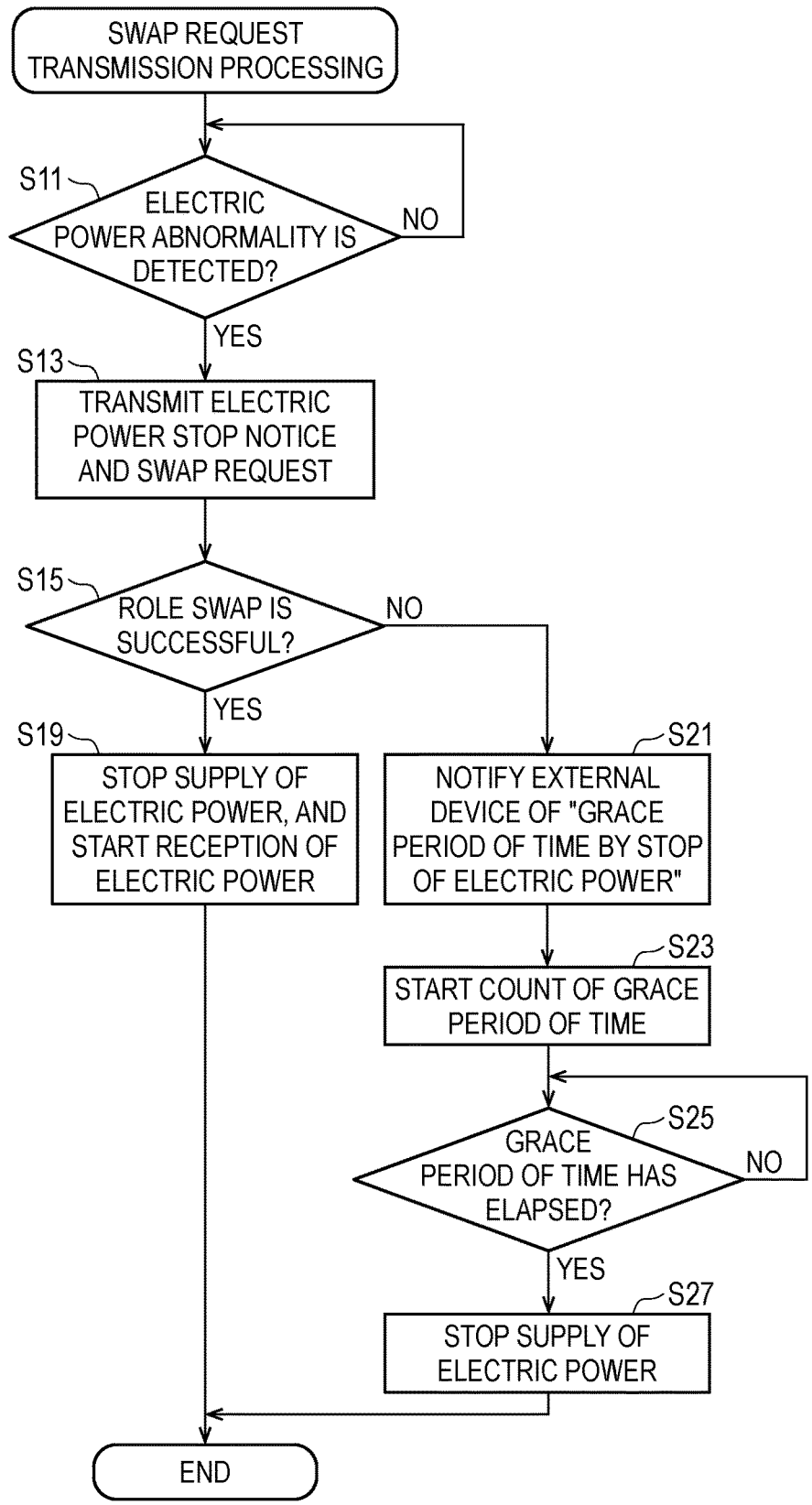
FIG. 3 is a flowchart showing contents of swap request transmission processing in accordance with the first embodiment.

In the meantime, the condition for starting the swap request transmission processing shown in FIG. 3 is not limited to the condition for starting the supply of electric power. For example, the CPU 12 may start the swap request transmission processing at the time when the power supply unit 27 is activated to start the supply of electric power. The flowcharts of the specification indicate processing of the CPU 12 according to commands described in the program. That is, in descriptions below, the processing such as "determination", "transmission", "notification" and the like indicates the processing of the CPU 12. The processing by the CPU 12 includes also hardware control. The swap request transmission processing shown in FIG. 3 may also be executed by a device other than the CPU 12. For example, the electric power controller 25 may execute the program PG to execute the swap request transmission processing shown in FIG. 3, First, in step (hereinbelow, simply denoted as "S") 11 in FIG. 3, the CPU 12 determines whether an electric power abnormality is detected. The CPU 12 detects an electric power abnormality, based on the first detection signal SI1 of the first voltage detection circuit 34, the second detection signal SI2 of the second voltage detection circuit 35 and the third detection signal SI3 of the AC supply monitoring circuit 36. When an electric power abnormality is detected in at least one of the first to third detection signals SI1 to SI3, for example, i.e., when it is determined that an electric power abnormality is detected by at least one of the first voltage detection circuit 34, the second voltage detection circuit 35, and the AC supply monitoring circuit 36, the CPU 12 makes an affirmative determination in S11 (S11: YES), and executes S13. When an electric power abnormality is not detected in all of the first voltage detection circuit 34, the second voltage detection circuit 35, and the AC supply monitoring circuit 36 (S11: NO)), the CPU 12 repeatedly executes the determination processing of S11. Therefore, the CPU 12 monitors an electric power abnormality all the time during the supply of electric power to the external device 61. In the meantime, the CPU 12 may also make an affirmative determination in S11 only when an electric power abnormality is detected in two circuits of the first voltage detection circuit 34, the second voltage detection circuit 35 and the AC supply monitoring circuit 36 or an electric power abnormality is detected in all the circuits.

First, processing of detecting an electric power abnormality of the supply electric power W by using the first voltage detection circuit 34 is described. As used herein, the electric power abnormality of the supply electric power W indicates a state where the supply electric power W becomes equal to or smaller than a predetermined minimum electric power, a case where the supply electric power W (the supply voltage Vs or the supply current As) equal to or larger than supply electric power (PDO) decided in negotiation occurs, and the like, for example. For the first threshold value TH1, for example, a lower limit value at which an electric power abnormality below the minimum electric power can be detected and an upper limit value at which an electric power abnormality above the PDO can be detected are set. For example, for the first threshold value TH1, a minimum voltage value (5V or the like) that can be supplied by USB PD is set as the lower limit value. The CPU 12 may set a voltage value of the supply voltage Vs of the electric power (PDO) that is actually supplied, a voltage value higher than the voltage value by several V or a maximum voltage value (20V or the like) that can be supplied by USB PD, as the upper limit value of the first threshold value TH1, based on a result of negotiation, for example.

In S11, when the voltage value of the supply voltage Vs indicated by the first detection signal SI1 becomes equal to or smaller than the lower limit value (5V or the like) of the first threshold value TH1, for example, the CPU 12 determines that an electric power abnormality has occurred (S11: YES). When the voltage value of the supply voltage Vs indicated by the first detection signal SI1 becomes equal to or greater than the upper limit value (the voltage value of the supply voltage Vs decided in negotiation, or the like) of the first threshold value TH1, for example, the CPU 12 determines that an electric power abnormality has occurred (S11: YES). Thereby, the CPU 12 can detect an electric power abnormality when the supply electric power W exceeds a range from the lower limit value to the upper limit value. In the meantime, the CPU 12 may determine only whether the voltage value is below the lower limit value or only whether the voltage value is above the upper limit value.

Subsequently, processing of detecting the electric power abnormality of the supply electric power W by using the second voltage detection circuit 35 is described. The second threshold value TH2 is, for example, a voltage value corresponding to a maximum electric power allowed to be supplied from the USB connection unit 19 or a value based on the voltage value, and a voltage value of 20V or higher is set, for example. The second voltage detection circuit 35 has a comparison circuit which compares the supply voltage Vs with the second threshold value TH2, for example. When the supply voltage Vs is lower than the second threshold value TH2, the second voltage detection circuit 35 outputs the second detection signal SI2 of a low level to the CPU 12, and when the supply voltage Vs is equal to or higher than the second threshold value TH2, the second voltage detection circuit 35 outputs the second detection signal SI2 of a high level to the CPU 12. The configuration of the second voltage detection circuit 35 is not particularly limited. The second voltage detection circuit 35 may also compare the supply voltage Vs with the second threshold value TH2 by software processing of the CPU or the like, without using the hardware such as the comparison circuit. The second voltage detection circuit 35 may output a difference (a positive voltage value or a negative voltage value) between the supply voltage Vs and the second threshold value TH2 to the CPU 12, as the second detection signal SI2. When the second detection signal SI12 of a high level is input from the second voltage detection circuit 35, for example, the CPU 12 determines in S11 that an electric power abnormality has occurred.

Subsequently, processing of detecting an electric power abnormality of the AC power supply by using the AC supply monitoring circuit 36 is described. As used herein, the electric power abnormality of the AC power supply indicates a state where the power supply cord 28 is unplugged from an AC port (also referred to as AC outlet) and the DC voltage V becomes 0V, a case where the AC voltage V1 is equal to or higher than 100V due to an abnormality of the AC power supply, and the like, for example. For the third threshold value TH3, for example, a minimum voltage value (0V or the like) and a maximum voltage value (a value equal to or higher than 25V, or the like) are set. In S11, when a voltage value of the DC voltage V2 indicated by the third detection signal SI3 is equal to or smaller than the minimum voltage value indicated by the third threshold value TH3 or is equal to or greater than the maximum voltage value, for example, the CPU 12 determines that an electric power abnormality has occurred (S11: YES). Thereby, the CPU 12 can detect an electric power abnormality when electric power supplied from the AC power supply exceeds a range from the predetermined minimum voltage value to the maximum voltage value. In the meantime, the CPU 12 may determine only whether the voltage value is below the minimum voltage value or only whether the voltage value is above the maximum voltage value. The contents of the determination processing are an example. For example, the first threshold value TH1 and the second threshold value TH2 may be the same value. As the first threshold value TH1, 0V or 100V may also be set.

In S11, when an electric power abnormality is detected (S11: YES), the CPU 12 transmits an electric power stop notice and a swap request to the external device 61 that is an electric power sink (S13). As used herein, the electric power stop notice is, for example, warning information for notifying in advance the external device 61 that the supply of electric power will be stopped, before stopping the supply of electric power based on detection of an electric power abnormality. A method of transmitting the electric power stop notice is not particularly limited. For example, the electric power stop notice may be transmitted by transmitting a message via the CC signal line (pin) of the USB connection unit 19. Specifically, the CPU 12 transmits an alert message defined in the USB PD standards to the external device 61 via the CC signal line.

As described later, when the electric power stop notice is received, the external device 61 executes predetermined processing. For this reason, for example, in a case where an external device having the same configuration as the printer 1 is connected as the external device 61, when a program, which processes an alert message as the electric power stop notice when, is set in the control program 41, the external device 61 can execute predetermined processing (stop of the external storage device 65, and the like), based on reception of the alert message.

The method of transmitting the electric power stop notice is not limited to the method where the CC signal line is used. For example, the warning information may also be transmitted by data communication where the D signal line is used. In this case, the external device 61 can execute predetermined processing, based on reception of data of the warning information via the D signal line.

The swap request that is transmitted in S13 is a request for swapping electric power roles of an electric power source and an electric power sink. The electric power role swap request can be transmitted and received by a method that complies with Power Role Swap or Fast Power Role Swap defined in the USB PD standards, for example.

After executing S13, the CPU 12 determines whether the swap of electric power roles (hereinbelow, referred to as 'role swap') is successful (S15). When information indicating that the swap request transmitted in S13 is accepted is received from the external device 61, the CPU 12 makes an affirmative determination in S15 (S15: YES), and executes S19. Alternatively, for example, in negotiation after executing the role swap, when there is a combination of desired electric power in the electric power list received from the external device 61, the CPU 12 may make an affirmative determination (S15: YES). As used herein, the combination of desired electric power is a combination of a voltage value and a current value that can be used as a power supply for each unit in the printer 1. This is because even though the swap request is accepted, if electric power to be received is not the desired electric power, the electric power received from the external device 61 cannot be used as a power supply for each unit. Also, for example, when information indicating that the swap request is rejected is received from the external device 61 or when time-out occurs without any response to the swap request even after a predetermined time elapses, the CPU 12 makes a negative determination in S15 (S15: NO), and executes S21.

In S19, the CPU 12 stops the supply of electric power, and starts reception of electric power. For example, the CPU 12 sets the switch circuit 33 to the off state to disconnect the DC/DC circuit 30 and the switching circuit 32, thereby stopping the supply of electric power. Thereby, after transmitting the electric power stop notice to the external device 61 in advance, it is possible to stop the supply of electric power to the external device 61. Since the supply of electric power to the external device 61 is not one-sidedly stopped while the external device receives electric power, the external device can suppress breakdown of an electronic device by executing stop processing and the like for the external storage device 65, as described later. In the meantime, before setting the switch circuit 33 to the off state in S19, the CPU 12 may transmit a reset signal for notifying that the supply of electric power will be stopped to the external device 61 via USB PD communication.

The CPU 12 controls the switching circuit 32 to switch the direction of electric power from the supply state to the electric power receiving state. Therefore, it is possible to supply the electric power received from the external device 61 via the USB connection unit 19 to each unit in the printer 1. After executing S19, the CPU 12 ends the processing shown in FIG. 3.

In S21, the CPU 12 reads out the grace period of time to stop the supply of electric power from the grace period information 45 (refer to FIG. 1), and notifies the same to the external device 61. The grace period of time is, for example, a period during which a control of stopping the supply of electric power to the external device 61 starts after the grace period of time is notified to the external device 61. When the role swap fails (S15: NO), there is a possibility that the external device 61 has rejected to be an electric power source. In this case, the external device 61 may have rejected the role swap because the external device does not have an independent power supply and the like and may fall into a state of deficiency in electric power. Therefore, the printer 1 of the present embodiment notifies the grace period of time before stopping the supply of electric power. The grace period of time is, for example, several ins (millisecond). The grace period of time may be a fixed value preset in the grace period information 45, or may be a value that is dynamically set in the grace period information 45 by the CPU 12, depending on a type of the external device 61 (a vendor ID, a product ID, a USB device class ID and the like). The method of transmitting the grace period of time to the external device 61 is not particularly limited. For example, similar to the electric power stop notice, the grace period of time may be transmitted to the external device 61 by communication where the CC signal line or the D signal line is used.

After executing S21, the CPU 12 starts to count the grace period of time (S23). A method of counting the grace period of time is not particularly limited. For example, the grace period of time may be counted by software processing of executing the control program 41 or may be counted by hardware such as a timer circuit.

After executing S23, the CPU 12 determines whether the grace period of time has elapsed (S25). The CPU 12 repeatedly executes the determination processing of S25 until the grace period of time elapses (S25: NO), When it is determined that the grace period of time has elapsed (S25: YES), the CPU 12 executes S27.

In S27, the CPU 12 executes control of stopping the supply of electric power. Similar to S19, the CPU 12 sets the switch circuit 33 to the off state to disconnect the DC/DC circuit 30 and the switching circuit 32, thereby stopping the supply of electric power. Thereby, after transmitting in advance the electric power stop notice and the grace period of time to the external device 61, it is possible to stop the supply of electric power to the external device 61. When the CPU 12 executes S27, the processing shown in FIG. 3 is over.

(4. Swap Request Reception Processing)

Subsequently, swap request reception processing that is executed by the external device 61 of the present embodiment is described with reference to FIG. 4. In descriptions below, as an example, a case where an external device 61 having the same configuration as the printer 1 is adopted as the external device 61 is described. Therefore, the printer 1 of the present embodiment is an example of the first information processing apparatus and the second information processing apparatus of the present disclosure. For example, the CPU 12 of the printer 1 connected as the external device 61 starts swap request reception processing shown in FIG. 4 when starting reception of electric power, as an electric power sink. The CPU 12 executes the swap request reception processing, thereby executing a role swap from an electric power sink to an electric power source. In descriptions below, in order to avoid confusion with the CPU 12 that executes the swap request transmission processing, the external device 61 is mainly described as the subject of the processing. However, when the printer 1 is connected as the external device 61, the CPU 12 of the printer 1 can actually execute the control program 41, thereby executing the swap request reception processing shown in FIG. 4. A device that is an electric power source is described as the printer 1 that executes the swap request transmission processing.

Figure 4:
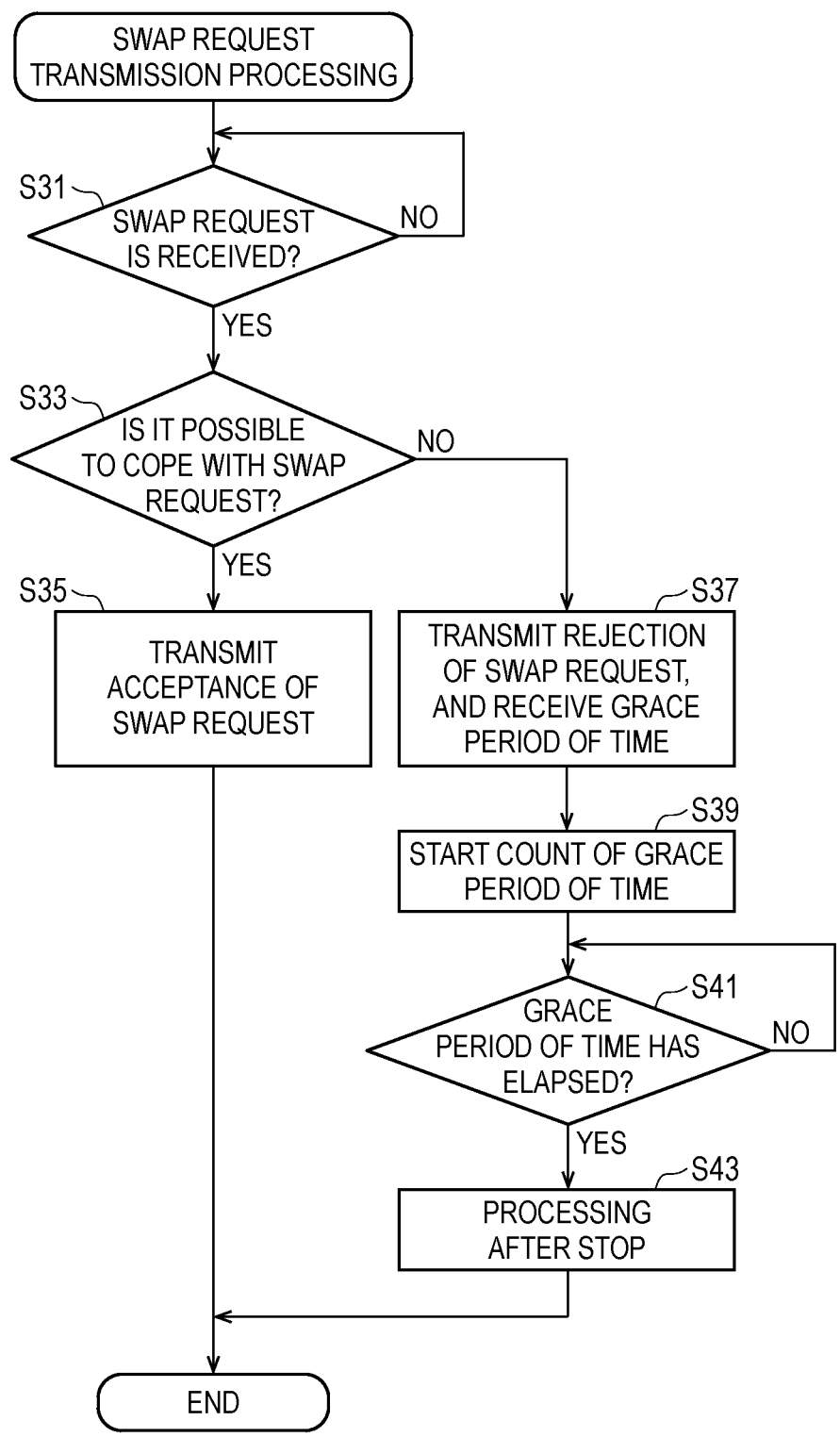
FIG. 4 is a flowchart showing contents of swap request reception processing in accordance with the first embodiment.

In the meantime, the condition for starting the swap request reception processing shown in FIG. 4 is not limited to the condition for starting the reception of electric power. For example, the external device 61 may start the swap request reception processing at the time when the system is activated to start the reception of electric power via the USB connection unit 19. The swap request reception processing shown in FIG. 4 may also be executed by a device other than the CPU 12. For example, the electric power controller 25 may execute the program PG to execute the swap request reception processing shown in FIG. 4.

First, in S31 of FIG. 4, the external device 61 determines whether the swap request is received from the printer 1 that is an electric power source. This swap request is the information transmitted in S13 of FIG. 3. The external device 61 repeatedly executes the determination processing of S31 until the swap request is received (S31: NO). Thereby, the external device 61 monitors the swap request transmitted from the device that is an electric power source, in a state where electric power is received.

When it is determined that the swap request is received from the printer 1 (S31: YES), the external device 61 determines whether it is possible to cope with the swap request (S33). For example, when the external device 61 is connected to the AC power supply or another device that is an electric power source, in addition to the printer 1, and can secure electric power, the external device 61 makes an affirmative determination in S33 (S33: YES). Even though the external device 61 is not connected to the AC power supply or another device that is an electric power source, when sufficient electric power is charged in the battery 31, the external device 61 may make an affirmative determination (S33: YES).

When the external device 61 makes an affirmative determination in S33 (S33: YES), the external device 61 executes S35. The external device 61 transmits information indicating that the swap request is accepted to the printer 1. The external device 61 executes the role swap, executes negotiation and starts the supply of electric power to the printer 1. The external device 61 ends the processing shown in FIG. 4. In the meantime, the external device 61 transmits the electric power list that can be supplied by the own device to the printer 1, in negotiation after executing the role swap, for example. However, when a combination of requested electric power is not notified from the printer 1, the external device 61 may not start the supply of electric power. This is because there is a possibility that electric power is not requested when there is no combination of electric power, which is required by the printer 1, in the electric power list, as described above.

On the other hand, when the external device 61 makes a negative determination in S33 (S33: NO), the external device 61 executes S37. The external device 61 transmits information indicating that the swap request is rejected to the printer 1. In this case, the role swap is not executed. The printer 1 determines in S15 of FIG. 3 that the role swap fails (S15: NO), and transmits the grace period of time to the external device 61 (S21). When the external device 61 receives the grace period of time from the printer 1 in S37 of FIG. 4, the external device 61 starts to count the grace period of time (S39).

Similar to S23 of FIG. 3, the external device 61 determines whether the grace period of time has elapsed after the counting of the grace period of time (S41). The external device 61 repeatedly executes the determination processing of S41 until the grace period of time elapses (S41: NO). When it is determined that the grace period of time has elapsed (S41: YES), the external device 61 executes S43.

In S43, the external device 61 executes processing after the supply of electric power from the printer 1 is stopped. For example, the external device 61 executes processing of reducing power consumption such as processing of stopping a system, processing of shifting to an electric power saving mode in which power consumption is lower, processing of stopping some of functions, and the like. Thereby, when the supply of electric power from the printer 1 is stopped, it is possible to safely stop the system partially or entirely. In the meantime, the external device 61 may also execute the system stop processing and the like before the grace period of time elapses. For example, in a case where another power supply such as the battery 31 is not provided, the external device 61 may stop the system before the supply of electric power from the printer 1 is stopped, i.e., while electric power is supplied.

When the external device 61 executes S41, the processing shown in FIG. 4 is over. In this way, when the printer 1 of the present embodiment is connected as a device (external device 61) that is an electric power sink, the printer 1 can execute the appropriate processing such as the role swap to an electric power source and the system stop, depending on whether it is possible to cope with the swap request.

(5. Storage Device Handling Processing)

Subsequently, storage device handling processing that is executed by the external device 61 of the present embodiment is described with reference to FIG. 5. In descriptions below, similar to the swap request reception processing shown in FIG. 4, a case where an external device 61 having the same configuration as the printer 1 is adopted as the external device 61 and the external storage device 65 is connected to the external device 61 is described. For example, the CPU 12 of the printer 1 connected as the external device 61 executes storage device handling processing shown in FIG. 5 when starting the reception of electric power, as an electric power sink. The CPU 12 executes, for example, the storage device handling processing shown in FIG. 5 in parallel with the swap request reception processing shown in FIG. 4. The CPU 12 executes the storage device handling processing to stop the external storage device 65 and the like before the supply of electric power is stopped. In descriptions below, similar to the swap request reception processing, the external device 61 is mainly described as the subject of the processing. However, when the printer 1 is adopted as the external device 61, the CPU 12 of the printer 1 can actually execute the control program 41, thereby executing the storage device handling processing shown in FIG. 5. A device that is an electric power source is described as the printer 1 that executes the swap request transmission processing. In the meantime, the storage device handling processing shown in FIG. 5 may also be executed by a device other than the CPU 12. For example, the electric power controller 25 may execute the program PG to execute the storage device handling processing shown in FIG. 5.

Figure 5:
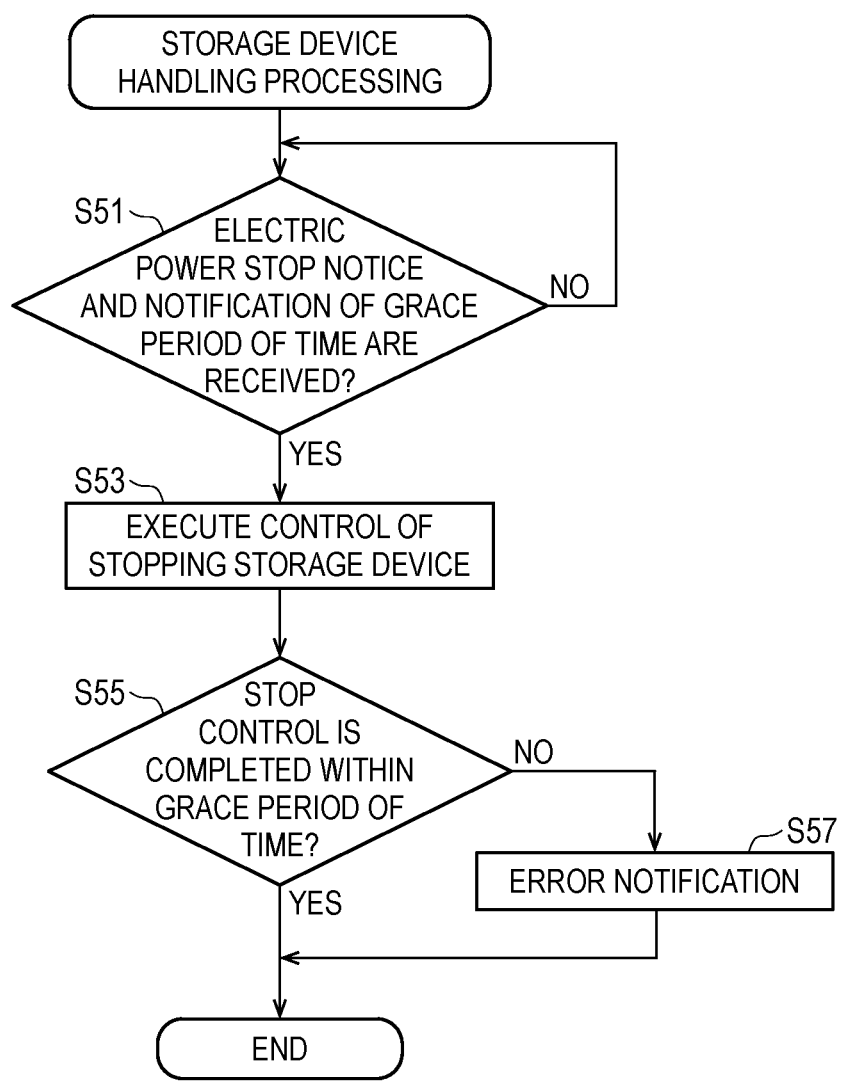
FIG. 5 is a flowchart showing contents of storage device handling processing in accordance with the first embodiment.

First, in S51 of FIG. 5, the external device 61 determines whether the electric power stop notice and the notification of the grace period of time are received. The electric power stop notice is the information transmitted in S13 of FIG. 3. The notification of the grace period of time is information transmitted in S21. The external device 61 repeatedly executes the processing of S51 until the electric power stop notice and the notification of the grace period of time are received (S51: NO). That is, the external device 61 executes the determination processing of S51 until the printer 1 determines in S15 of FIG. 3 that the role swap fails and notifies the grace period of time in S21.

When it is determined that the electric power stop notice and the notification of the grace period of time are received (S51: YES), the external device 61 executes control for a halt of the storage device (S53). Herein, if an electric power abnormality occurs in the printer 1 that is an electric power source and the supply of electric power is thus stopped or restricted, the system of the external device 61 that is an electric power sink may stop due to deficiency in electric power. If the printer 1 stops one-sidedly the supply of electric power without any notice, for example, the external device 61 is stopped, so that data stored in the memory 63 or the external storage device 65 (hereinbelow, also referred to as 'storage device') may be damaged or the storage device itself may be broken down. Therefore, in a case where the printer 1 of the present embodiment functions as an electric power source, the printer 1 notifies the electric power stop notice and the grace period of time to the device that is an electric power sink, before stopping the supply of electric power. In a case where the printer 1 functions as an electric power sink, when the printer 1 receives the electric power stop notice and the grace period of time, the printer 1 stops the storage device before the supply of electric power is stopped, thereby the storage device appropriately halts.

In S53, the external device 61 executes processing of saving data stored in the memory 63, processing of stopping the electric power that is supplied to the memory 63, and the like, for example. The external device 61 executes processing of stopping communication with the external storage device 65, processing of outputting a stop signal to the external storage device 65 to stop the system of the external storage device 65, processing of stopping the electric power that is supplied to the external storage device 65, and the like.

After executing S53, the external device 61 executes S55. In S5, the external device 61 determines whether the stop processing of the storage device is completed within the grace period of time received from the printer 1. When it is determined that the stop processing is completed (S55: YES), the external device 61 ends the processing shown in FIG. 5. In this case, the external device 61 is in a state where the storage device is appropriately stopped.

On the other hand, for example, when an error occurs in the processing of saving data of the memory 63 and the grace period of time has elapsed, when a response to the stop signal cannot be received from the external storage device 65 and the grace period of time has elapsed and when the supply of electric power to the storage device cannot be stopped and the grace period of time has elapsed, the external device 61 makes a negative determination in S55 (S55: NO). In this case, the external device 61 is in a state where the storage device is not appropriately stopped within the grace period of time. Therefore, when the external device 61 makes a negative determination in S55 (S55: NO), the external device executes processing of notifying an error (S57). For example, the external device 61 stores a history of error indicating that the storage device is not stopped in the NVRAM 15 or executes an error notification such as displaying an error screen on the user interface 20. When the external device 61 is stopped due to deficiency in electric power, the external device may print error information on a sheet by the image forming unit 16 and then discharge the sheet.

In S43 of the swap request reception processing shown in FIG. 4, when completely stopping the system of the external device 61, the external device 61 may execute in advance the determination processing of S55 before the grace period of time elapses, thereby completing the processing of S55 and S57. This is because when the grace period of time elapses (S41: YES) and the system is to be stopped in S43 in the processing of FIG. 4, the external device 61 should execute the error notification processing of S57 before the stop. For example, when it is determined in the determination processing of S55 that a response to the stop signal cannot be received from the external storage device 65 and the grace period of time is highly likely to elapse, for example, the external device 61 may make a negative determination in S55. Thereby, it is possible to execute the error notification before stopping the system.

After executing S57, the external device 61 ends the processing shown in FIG. 5. In this way, when the printer 1 of the first embodiment is connected as a device (external device 61) that is an electric power sink, the printer 1 can execute the appropriate processing such as error notification, depending on whether it is possible to stop the storage device within the grace period of time.

(6. Swap Request Transmission Processing of Second Embodiment)

Subsequently, a second embodiment of the present disclosure is described. In descriptions below, the processing similar to the first embodiment is denoted with the same reference signs, and the descriptions thereof are omitted as appropriate. In the second embodiment, similar to the first embodiment, the printer 1 is adopted as both an electric power source and an electric power sink. However, for convenience of descriptions, a device that is an electric power source is referred to as the printer 1, and a device that is an electric power sink is referred to as the external device 61.

Figure 6:
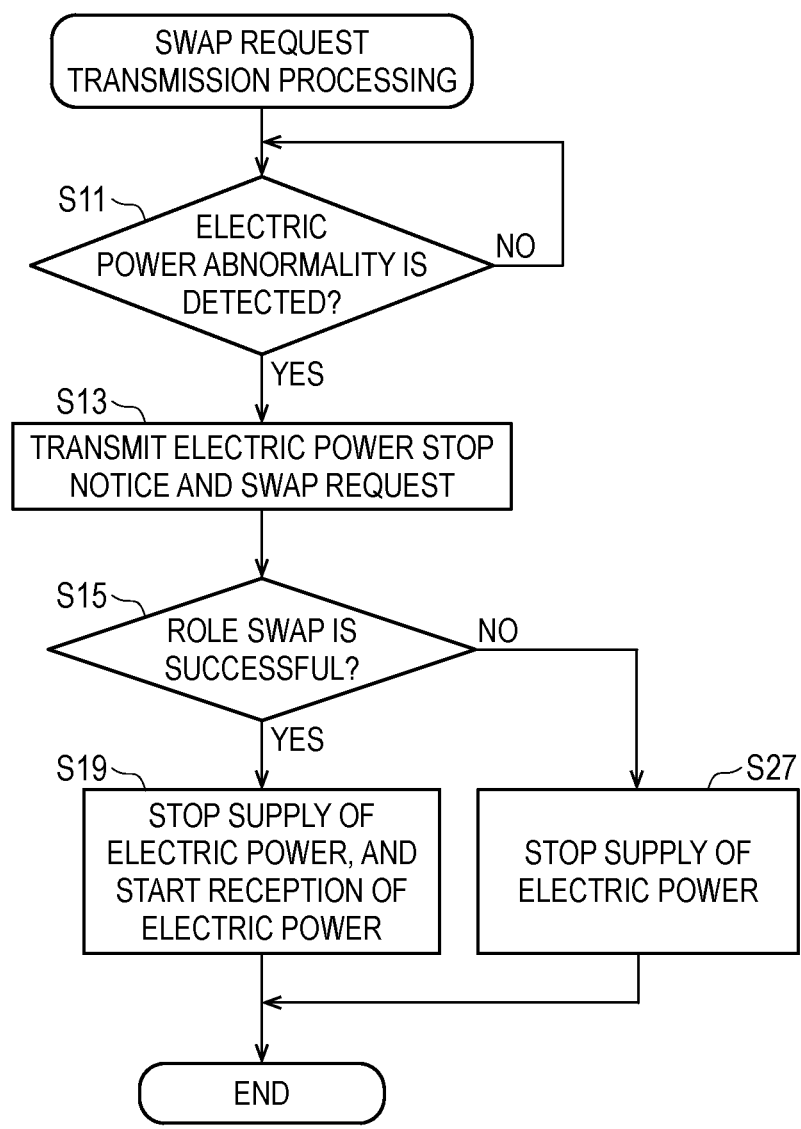
FIG. 6 is a flowchart showing contents of swap request transmission processing in accordance with a second embodiment.

FIG. 6 shows contents of the swap request transmission processing of the second embodiment. In the second embodiment, the CPU 12 of the printer 1 does not execute the notification of the grace period of time. As shown in FIG. 6, when an electric power abnormality is detected in S (S11: YES), the CPU 12 transmits an electric power stop notice and a swap request to the external device 61 in S13. When the role swap fails (S15: NO), the CPU 12 executes processing of stopping the supply of electric power without notifying the grace period of time (S27).

(7. Swap Request Reception Processing of Second Embodiment)

Figure 7:
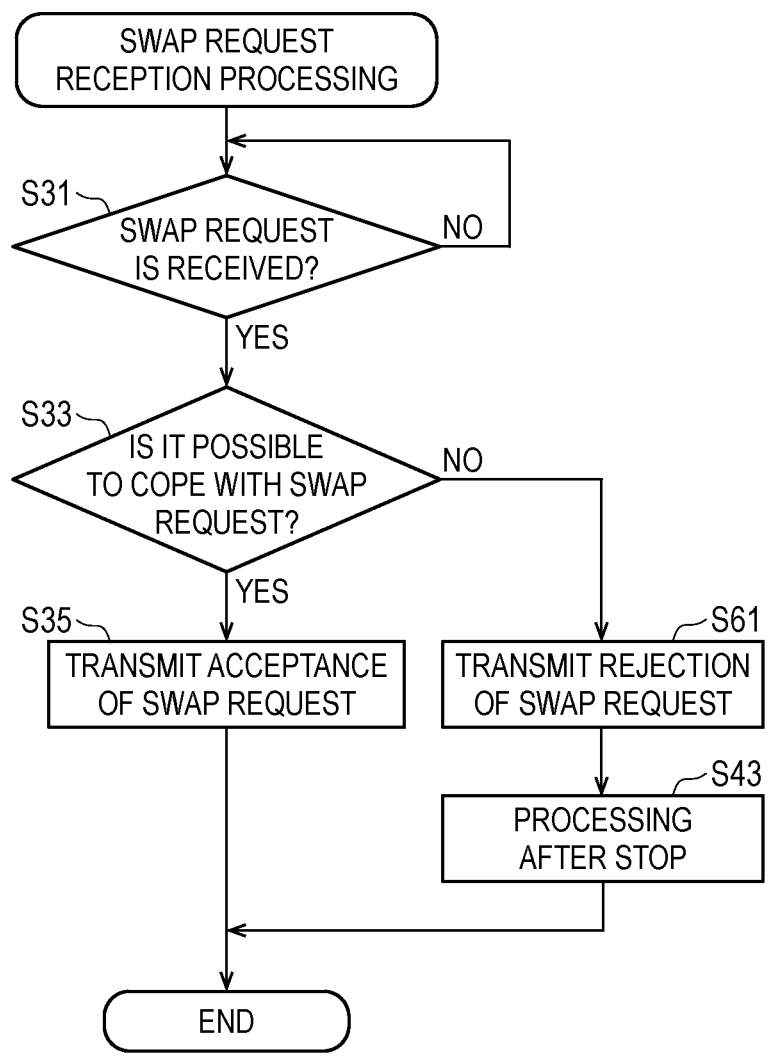
FIG. 7 is a flowchart showing contents of swap request reception processing in accordance with the second embodiment.

FIG. 7 shows contents of the swap request reception processing of the second embodiment. In the second embodiment, as shown in FIG. 6, the printer 1 that is an electric power source does not notify the grace period of time. For this reason, as shown in FIG. 7, when the external device 61 that is an electric power sink receives the swap request and determines that it is not possible to cope with the swap request (S33: NO), the external device 61 transmits information indicating that the swap request is rejected to the printer 1 (S61), and executes processing of stopping the system, and the like (S43). That is, the external device 61 does not execute the processing of S43 after waiting for the elapse of the grace period of time, unlike S37, S39 and S41 of the swap request reception processing of the first embodiment shown in FIG. 4.

(8. Storage Device Handling Processing of Second Embodiment)

Figure 8:
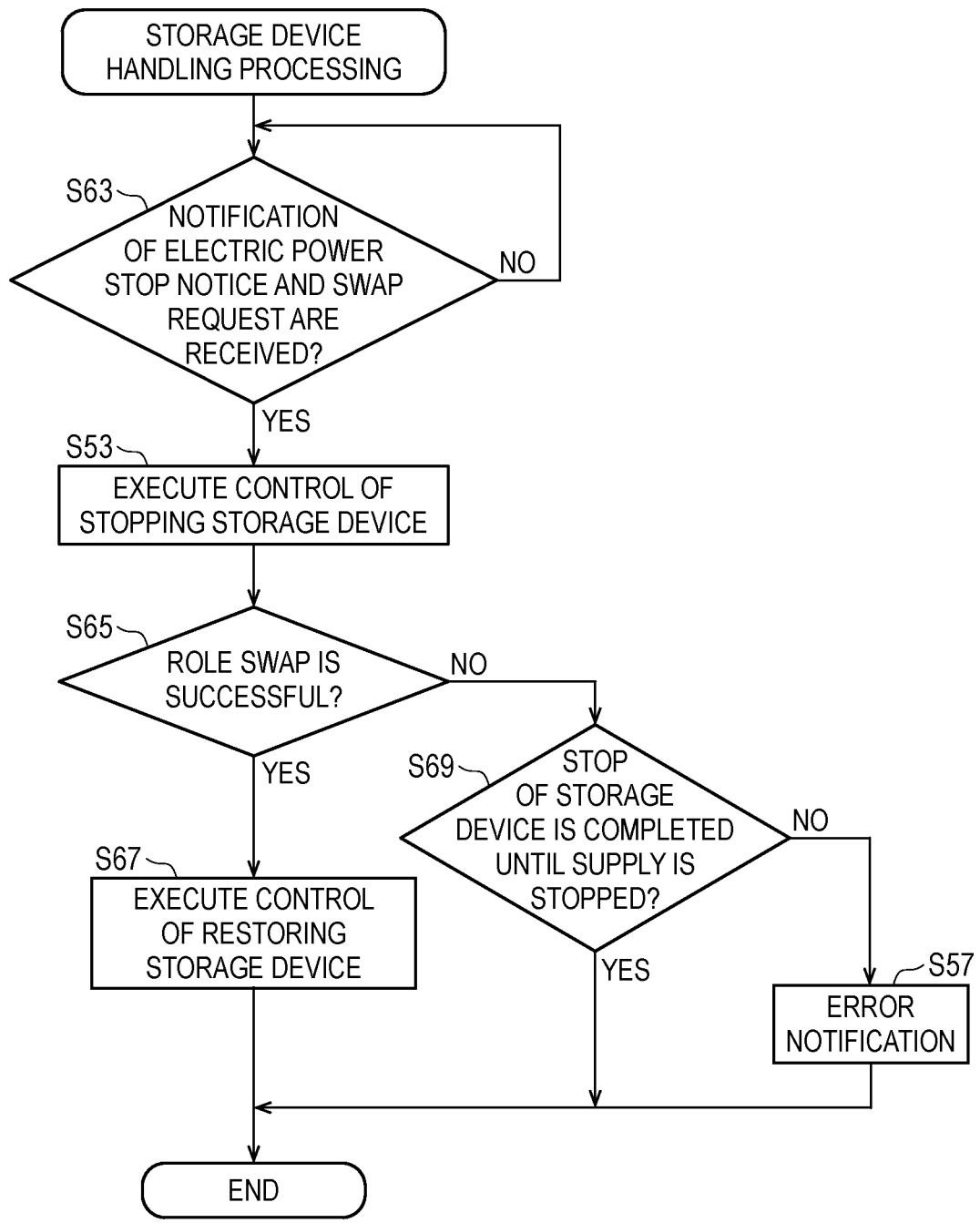
FIG. 8 is a flowchart showing contents of storage device handling processing in accordance with the second embodiment.

FIG. 8 shows contents of the storage device handling processing of the second embodiment. In the storage device handling processing of the first embodiment, as shown in FIG. 5, when the external device 61 receives the electric power stop notice and the notification of the grace period of time (S51: YES), the external device 61 executes the processing of S53 and thereafter. In contrast, when the external device 61 of the second embodiment receives the notification of the electric power stop notice and the swap request (S63: YES), the external device 61 starts control for the halt of the storage device (S53). The external device 61 of the first embodiment does not execute control for the halt of the storage device (S53 in FIG. 5) until the grace period of time is received, i.e., until the device that is an electric power source determines that the role swap fails (S15: NO in FIG.

3) and transmits the grace period of time in S21. In contrast, when the external device 61 of the second embodiment receives the notification of the electric power stop notice and the swap request (S63: YES), the external device starts control for the halt of the storage device (S53), irrespective of whether the role swap is successful. Thereby, it is possible to start more rapidly the control for the halt of the storage device. In the meantime, the external device 61 may also start the control for the halt of the storage device in S53 when any one of the electric power stop notice and the swap request is received.

Then, as shown in FIG. 8, the external device 61 determines whether the role swap is successful (S65), after starting the stop control in S53. For example, when the external device 61 makes an affirmative determination in S33 of FIG. 7 or executes S35, the external device 61 makes an affirmative determination in S65 (S65: YES), and executes S67. On the other hand, for example, when the external device 61 makes a negative determination in S33 of FIG. 7 or executes S61, the external device 61 makes a negative determination in S65 (S65: NO), and executes S69. Alternatively, for example, in negotiation after executing the role swap, when the external device 61 transmits the electric power list that can be supplied by the own device to the printer 1 but a combination of requested electric power is not notified from the printer 1, the external device 61 may make a negative determination in S65.

In S67, the external device 61 executes control of restoring the storage device. Therefore, the external device 61 of the second embodiment starts the control for the halt of the storage device before the role swap (S53), and restores the storage device (S67) when the role swap is successful (S65: YES). For example, the external device 61 executes processing of writing the data saved in S53 into the memory 63, processing of resuming communication with the storage device, processing of supplying electric power to the storage device, processing of outputting an activation signal to the external storage device 65 to activate the system, and the like. Thereby, when the role swap is successful and the electric power can be secured, it is possible to use the storage device without the halt of the storage device. When the external device 61 executes S67, the processing shown in FIG. 8 is over, In S69, the external device 61 determines whether it is possible to complete the control for the halt of the storage device until the supply of electric power is stopped. As shown in FIG. 7, when the external device 61 cannot cope with the swap request (S33: NO), the external device 61 transmits information indicating that the swap request is rejected to the printer 1 (S61). As shown in FIG. 6, when it is determined that the role swap fails (S15: NO), the printer 1 stops the supply of electric power (S27). For this reason, when a predetermined time elapses after executing S61, the supply of electric power to the external device 61 is stopped.

The external device 61 executes S69 at a predetermined timing before the supply of electric power is stopped after making a negative determination in S65, for example, and determines whether the control in S53 is completed. The predetermined timing is a timing that is changed according to the execution situation of S33 or S61. For example, the predetermined timing is a time earlier than an average time after the rejection information of S61 is transmitted until the supply of electric power is stopped. Thereby, before the supply of electric power is stopped, the processing of S69 or S57 to be described later can be completed. When the processing of stopping the supply of electric power to the storage device, the processing of stopping the system of the external storage device 65 or the like is completed at the time when the processing of S69 is executed, for example, the external device 61 makes an affirmative determination in S69 (S69: YES), and ends the processing shown in FIG. 8. In this case, the control for the halt of the storage device is completed before the supply of electric power is stopped.

On the other hand, when the control for the halt of the storage device is not completed at the time when the processing of S69 is executed, for example, the external device 61 executes processing of notifying an error (S57). When S57 is executed, the control for the halt of the storage device cannot be completed before the supply of electric power is stopped. Therefore, the external device 61 executes processing of leaving information of an error, which indicates that the storage device cannot be stopped, in the NVRAM 15, for example. The external device 61 ends the processing shown in FIG. 8. In the meantime, the external device 61 may not execute the processing of S69 or S57 before the supply of electric power is stopped. For example, when a power supply can be secured even though the supply of electric power from the printer 1 is stopped, the external device 61 may execute the determination processing of S69 or the error notification processing of S57 after the supply of electric power from the printer 1 is actually stopped.

In this way, in a case where the printer 1 of the second embodiment is connected as a device (external device 61) that is an electric power sink, when the printer 1 receives the electric power stop notice and the like, the printer 1 can halt the storage device with more reliability by halting the storage device immediately. When the role swap is successful, the printer 1 can restore the storage device.

(9. Storage Device Handling Processing of Third Embodiment)

Figure 9:
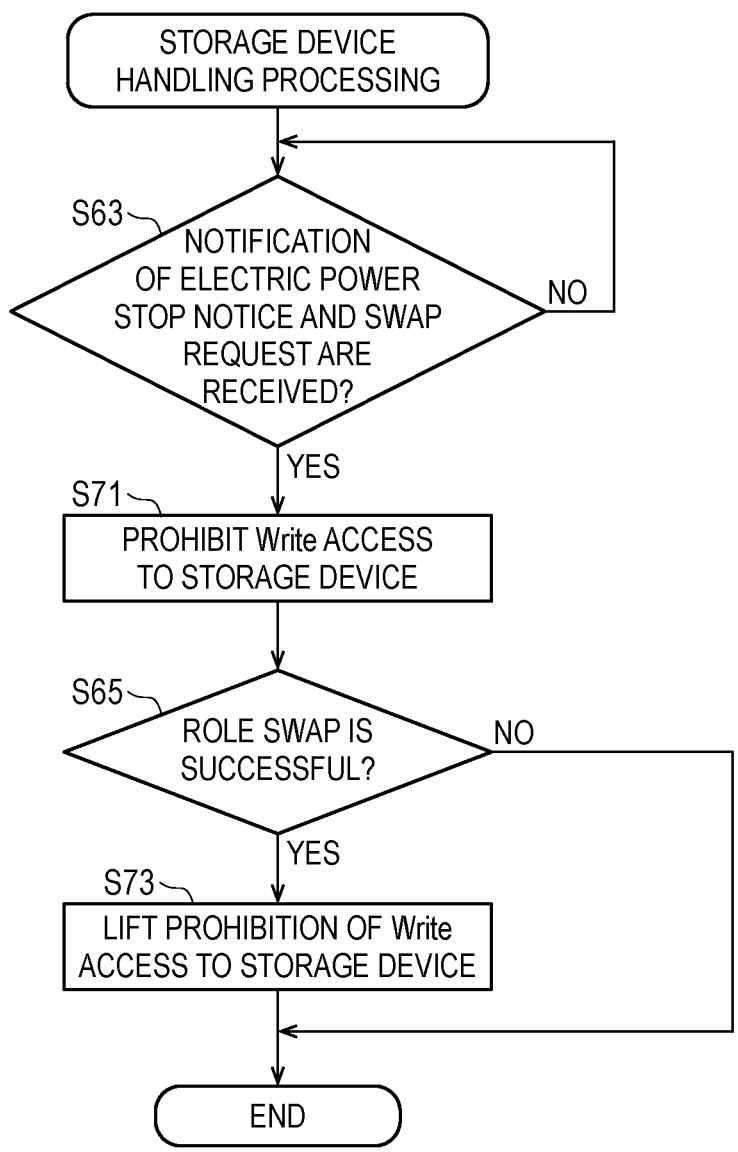
FIG. 9 is a flowchart showing contents of storage device handling processing in accordance with a third embodiment.

Subsequently, a third embodiment of the present disclosure is described. FIG. 9 shows contents of the storage device handling processing of the third embodiment. The swap request transmission processing and the swap request reception processing of the third embodiment are similar to those of the second embodiment (refer to FIGS. 6 and 7). The external device 61 of the third embodiment executes control of prohibiting Write access without executing the control for the halt of the storage device, in the storage device handling processing. In descriptions below, the processing similar to the second embodiment is denoted with the same reference signs, and the descriptions thereof are omitted as appropriate.

Specifically, as shown in FIG. 9, when the external device 61 of the third embodiment receives the notification of the electric power stop notice and the swap request after starting the storage device handling processing (S63: YES), the external device 61 executes control of prohibiting Write access to the storage device (S71). The external device 61 stops writing processing into the memory 63 or the external storage device 65, which is being executed or is scheduled to be executed, for example. Even when processing that requires writing to the memory 63 or the external storage device 65 occurs, the external device 61 executes control of not executing writing to the memory 63 or the like. For example, the external device 61 executes processing of disconnecting communication with the external storage device 65, processing of shifting to a mode in which writing to the external storage device 65 is not executed, and the like. Therefore, the external device 61 of the third embodiment prohibits Write access without the halt of the storage device. Thereby, it is possible to suppress a situation where the external device 61 is stopped due to deficiency in electric power during writing to the storage device, so that data in the storage device is damaged or the storage device itself is broken down.

After executing S71, the external device 61 determines whether the role swap is successful (S65), and lifts the prohibition of Write access (S73) when it is determined that the role swap is successful (S65: YES). Therefore, the external device 61 of the third embodiment prohibits Write access to the storage device (S71) before the role swap, and resumes Write access when it is determined that the role swap is successful (S65: YES). The external device 61 resumes communication with the storage device, executes the processing stopped in S71, and starts writing to the storage device, for example. Thereby, when the role swap is successful and the electric power can be secured, it is possible to keep performing the writing processing to the storage device without the halt of the storage device. When the external device 61 executes S73, the processing shown in FIG. 9 is over.

In this way, in the case where the printer 1 of the third embodiment is connected as a device (external device 61) that is an electric power sink, when the printer 1 receives the electric power stop notice and the like, the printer 1 prohibits immediately Write access to the storage device, thereby suppressing breakdown and the like of the storage device with more reliability. When the role swap is successful, Write access to the storage device is resumed, so that it is possible to execute data writing.

For reference, the printer 1 and the external device 61 are examples of the information processing apparatus, the first information processing apparatus, the second information processing apparatus and the external device. The connection configuration of the printer 1 and the external device 61 is an example of the electric power transfer system. The CPU 12 is an example of the controller, the first controller and the second controller. The USB connection unit 19 and the receptacle 51 are examples of the interface, the first interface and the second interface. The AC/DC circuit 29 and the DC/DC circuit 30 are examples of the power supply. The first voltage detection circuit 34, the second voltage detection circuit 35 and the AC supply monitoring circuit 36 are examples of the detector. The memory 63 and the external storage device 65 are examples of the storage device. The first detection signal SI1, the second detection signal SI2 and the third detection signal SI3 are examples of the detection value. The electric power stop notice and the grace period of time are examples of the warning information. S13 and S21 are examples of the transmission process.

(10. Effects)

According to the embodiments, following effects are achieved.

(1) When the detection value of at least one of the first voltage detection circuit 34, the second voltage detection circuit 35 and the AC supply monitoring circuit 36 indicates an abnormal value (S11: YES) while the electric power is supplied to the external device 61 via the USB connection unit 19, the CPU 12 of the printer 1 of the present embodiment executes the processing (an example of the transmission processing) of S13 and S21 of transmitting the warning information to the external device 61 via the USB connection unit 19.

According to this configuration, when an electric power abnormality is detected by the first voltage detection circuit 34 and the like, the CPU 12 transmits the warning information to the external device 61 that is an electric power sink. Thereby, the external device 61 can receive the warning information before the supply of electric power is stopped, and can implement in advance the appropriate measures such as the stop of the system, the stop of the storage device, the prohibition of Write access to the storage device, and the like. As a result, it is possible to suppress breakdown of the electronic device (the memory 63 or the external storage device 65) on the electric power sink-side.

(2) The warning information is message information that complies with USB PD standards. The USB connection unit 19 is a USB interface. The CPU 12 may also transmit the message via the CC signal line of the USB connection unit 19. According to this configuration, the CPU 12 can transmit the warning information to the external device 61 through the CC signal line by using the message that complies with USB PD standards. Thereby, when an electric power abnormality occurs while electric power is supplied via the USB interface, it is possible to appropriately transmit the warning information via communication of USB PD.

(3) The message that is used for the warning information may also an alert message defined in the USB PD standards. According to this configuration, the CPU 12 transmits the alert message of USB PD standards to the external device 61, as the warning information. Thereby, the external device 61 can execute the appropriate measures (the stop of the storage device, and the like) by presetting contents of control that is executed when the alert message is received, i.e., contents of control that is executed when the warning information of an electric power abnormality is received.

(4) In the processing of S13, the CPU 12 transmits the information (electric power stop notice), which indicates that the supply electric power to be supplied to the external device 61 via the USB connection unit 19 is to be restricted, as the warning information. According to this configuration, it is possible to notify in advance the external device 61 that the supply electric power W is to be restricted (the stop of the supply of electric power, and the like) by transmitting the warning information.

(5) In the processing of S21, the CPU 12 transmits, as the warning information, the information indicating the grace period of time until the restriction of the supply electric power W, which is supplied to the external device 61 via the USB connection unit 19, is started. According to this configuration, it is possible to notify in advance the external device 61 of the grace period of time until the restriction of the supply electric power W (the stop of the supply of electric power, and the like) is started by transmitting the warning information. The external device 61 can execute the appropriate measures such as executing necessary processing within the grace period of time or notifying an error when it is not possible to make it in time.

(6) When it is determined that the grace period of time has elapsed (S25: YES), the CPU 12 restricts the supply electric power W that is supplied to the external device 61 (S27). According to this configuration, after giving the predetermined grace period of time to the external device 61, it is possible to restrict the supply electric power W. The supply electric power W is restricted, so that it is possible to protect the power supply or an electronic device in the device.

(7) The CPU 12 executes the processing of stopping the supply of electric power to the external device 61, as the processing of restricting the supply electric power W (S27). According to this configuration, the supply of electric power is stopped, so that it is possible to protect the power supply or an electronic device in the device with more reliability.

(8) The USB connection unit 19 is a USB interface. The CPU 12 may also transmit the warning information via the D signal line of the USB connection unit 19. According to this configuration, the CPU 12 can transmit the warning information to the external device 61 by the D signal line of the USB interface. Thereby, it is possible to transmit the necessary information by data communication of USB standards, as the warning information.

(9) In the processing of S13, the CPU 12 may transmit the information, which indicates that the supply electric power W is to be restricted, by the D signal line. According to this configuration, the warning information is transmitted via the D signal line, so that it is possible to notify in advance the external device 61 that the supply electric power W is to be restricted.

(10) In the processing of S21, the CPU 12 may transmit the information, which indicates the grace period of time until the restriction of the supply electric power W is started, via the D signal line. According to this configuration, the warning information is transmitted via the D signal line, so that it is possible to notify in advance the external device 61 of the grace period of time to start the restriction of the supply electric power W.

(11) The USB connection unit 19 is a USB interface. According to this configuration, in the information processing apparatus which supplies electric power to the external device 61 via the USB interface, when an electric power abnormality occurs, the warning information is transmitted to the external device 61, so that it is possible to suppress the breakdown of the external device 61.

(12) The printer 1 includes the image forming unit 16 which forms an image based on image data, and the image scanning unit 17. According to this configuration, it is possible to suppress the breakdown of the external device 61 by transmitting the warning information from an image forming apparatus having the image forming unit 16 or the image scanning unit 17 to the external device 61.

(13) The printer 1 can be connected as the external device 61. In this case, the printer 1 includes the USB connection unit 19 and the CPU 12. When the warning information, which indicates an electric power abnormality of the external device, is received from the external device while electric power is received from the external device (the printer 1 that is an electric power source) via the USB connection unit 19, the CPU 12 executes the controlling for prohibition of writing into the memory 63 (the RAM 13, the ROM 14, the NVRAM 15) and the external storage device 65 (S71 in FIG. 9) or the controlling for the halt of the storage device (S53) (an example of the storage device handling processing).

According to this configuration, when the warning information indicating an electric power abnormality is received from the external device that is an electric power source, the CPU 12 prohibits writing into the storage device. Thereby, it is possible to suppress the own device from stopping due to deficiency in electric power during the writing and to suppress a file being written or other data from being damaged. The CPU 12 stops the storage device, based on reception of the warning information, so that it is possible to appropriately stop the storage device before the supply of electric power from the external device 61 is stopped and the own device is thus stopped. Therefore, it is possible to suppress the breakdown of the storage device.

(14) When the swap request for swapping electric power roles with the external device 61 is received from the external device 61, the CPU 12 executes the processing of S33, S35 and S61 (an example of the swap processing) of swapping the electric power roles, the processing of S65 (an example of the determination processing as to whether the swap processing is successful) of determining whether the swap of electric power roles is successful, as a result of the swap processing, and the processing (an example of the return processing) of S67 and S73 of returning to a state before the storage device handling processing is executed, when it is determined as a result of the processing of S65 that the swap of electric power roles is successful (S65: YES).

According to this configuration, when the swap request is received from the external device 61, the CPU 12 swaps the electric power roles. When the swap of electric power roles is successful, the own device becomes an electric power source and supplies electric power to the external device 61. That is, there is a high possibility that the own device is in a state where it is possible to secure electric power. Therefore, when the swap of electric power roles is successful, the CPU 12 executes the processing such as lifting the prohibition of writing into the storage device or activating the storage device, and returns to a state before the storage device handling processing is executed. Thereby, when electric power can be secured, it is possible to restore the printer 1 to a usual state.

(11. Modified Embodiments)

The present disclosure is not limited to the above embodiments, and can be diversely improved and modified without departing from the gist of the present disclosure.

For example, in the above embodiments, the CPU 12 executes the controls shown in FIGS. 3 to 9. However, another device may also execute the controls. For example, the electric power controller 25 may execute the program PG of the memory 26 to execute the controls shown in FIGS. 3 to 9. In this case, the electric power controller 25 is an example of the controller of the present disclosure. The program PG is an example of the program of the present disclosure.

The configuration of the power supply unit 27 shown in FIG. 2 is an example. For example, in the above embodiments, as the detector, the voltage detection circuits (the first voltage detection circuit 34, the second voltage detection circuit 35 and the AC supply monitoring circuit 36) are provided. However, a current detection circuit which detects current may also be provided as the detector. For example, as shown in FIG. 10, the power supply unit 27 may include a first current detection circuit 34A, a second current detection circuit 35A and an AC supply monitoring unit 36A which each outputs a detection signal based on a current value.

For example, the first current detection circuit 34A outputs information indicating a magnitude of a current value of the supply current As to the CPU 12, as the first detection signal SI1, based on current flowing through an internal resistor connected in series with the electric power line 37. The second current detection circuit 35A compares the magnitude of the current value of the supply current As with the second threshold value TH2, based on the current flowing through an internal resistor connected in series with the switching circuit 32, and to output a result of the comparison to the CPU 12, as the second detection signal SI2, for example. The second threshold value TH2 is a value based on the maximum current allowed to be supplied from the USB connection unit 19, for example, and a current value of 5A or higher is set. The AC supply monitoring circuit 36A outputs information indicating a magnitude of a current value of AC current to the CPU 12, as the third detection signal SI3, based on AC current flowing through an internal resistor connected in series with a high side (power supply cord 28-side) of the AC/DC circuit 29. In the meantime, the AC supply monitoring circuit 36A may also be connected to the electric power line 38.

Therefore, the first current detection circuit 34A, the second current detection circuit 354 and the AC supply monitoring circuit 36A output the first to third detection signals SI1 to SI3 corresponding to the current value flowing through each electric power line. Similar to the above embodiments, the CPU 12 may determine the electric power abnormality, based on the current value. Specifically, the CPU 12 may compare the current value indicated by the first detection signal SI1 with the first threshold value TH1, and may determine the electric power abnormality when the supply current As is equal to or lower than the predetermined lower limit value (0 A, 0.5 A, 1.5 A or the like), is equal to or higher than the upper limit value (the maximum current value (5 A or the like) of the USB PD standards) or is equal to or higher than the maximum current value that can be transmitted through the electric power line 37.

Figure 10:
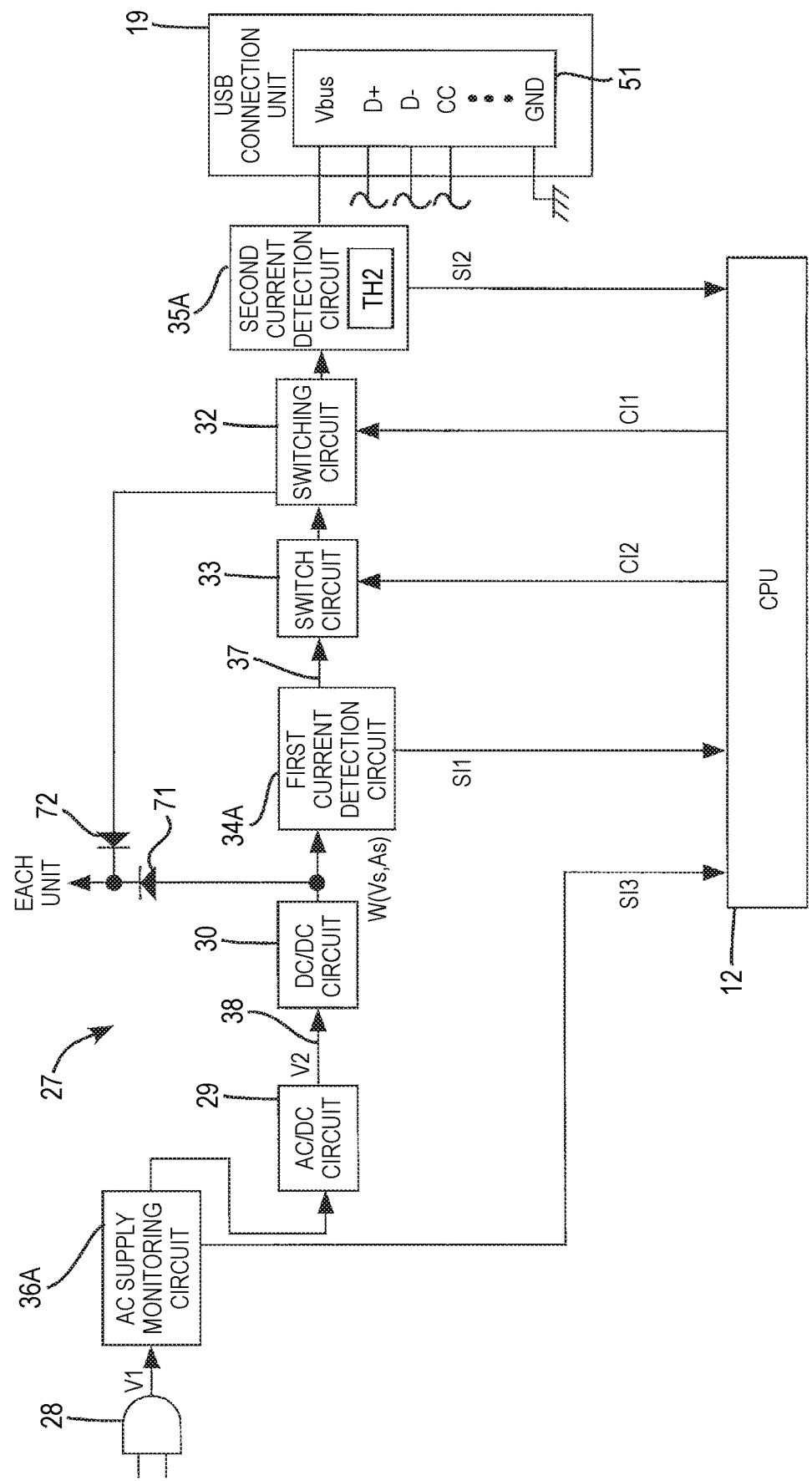
FIG. 10 is a block diagram depicting a configuration of the power supply unit of another example.

Like the second current detection circuit 35A shown in FIG. 10, the detector of the present disclosure may be arranged on the USB connection unit 19-side (low side) of the switch circuit 33. Like the AC supply monitoring circuit 36A, the detector may be arranged on the power supply cord 28-side (high side) of the AC/DC circuit 29. Therefore, the detector of the present disclosure can be connected to the diverse electric power lines from the power supply cord 28 (AC power supply) to the USB connection unit 19 (the interface with the external device 61). Each of the detectors may be the current detection circuit or the voltage detection circuit having the same or different configuration.

The power supply unit 27 shown in FIG. 2 may include at least one of the first voltage detection circuit 34, the second voltage detection circuit 35, and the AC supply monitoring circuit 36. The power supply unit 27 shown in FIG. 10 may include at least one of the first current detection circuit 34A, the second current detection circuit 35A and the AC supply monitoring circuit 36A. That is, the power supply unit 27 may include at least one of the detectors.

The power supply unit 27 may include four or more detectors.

The power supply unit 27 may include a detector which detects a voltage and a detector which detects a current. For example, the power supply unit 27 may include the first voltage detection circuit 34 and the first current detection circuit 34A.

A circuit which detects voltage or current may be provided in the switch circuit 33 or in the switching circuit 32.

The CPU 12 may change the second threshold value TH2 in the second voltage detection circuit 35 and to change a range for determining the electric power abnormality. For example, the CPU 12 may output the control signal to the second voltage detection circuit 35, based on the value of the supply voltage Vs or the supply current As, thereby changing the second threshold value TH2. The CPU 12 may execute the determination by using the second threshold value TH2. The first voltage detection circuit 34 or the first current detection circuit 34A may execute the determination by using the first threshold value TH1.

The first threshold value TH1 and the second threshold value TH2 may be the same value. That is, the first threshold value TH1 may be identical to the second threshold value TH2.

The communication standards of the interface of the present disclosure are not limited to the communication standards of the USB PD standards, and may be other communication standards under which electric power can be transferred. In this case, the warning information such as the electric power stop notice, the grace period of time and the like may also be transmitted via communication lines of other communication standards such as the D signal line and the CC signal line.

In the above embodiments, the CPU 12 executes the processing of stopping the electric power that is supplied, in S27. However, the CPU 12 may also execute restriction processing of reducing the voltage value or the current value. That is, the CPU 12 may not completely stop the supply of electric power.

The CPU 12 may notify only one of the electric power stop notice and the grace period of time to the external device 61.

The CPU 12 may execute both the controlling (S71 in FIG. 9) for prohibition of writing into the external storage device and the controlling (S53) for the halt of the storage device.

In the above embodiment, the CPU 12 is adopted as the controller of the present disclosure. However, the present disclosure is not limited thereto. For example, at least some of the controller may be configured by dedicated hardware such as an ASIC (Application Specific Integrated Circuit). The controller may operate in combination with software processing and hardware processing, for example.

The configuration of the information processing apparatus of the above embodiment is an example. For example, the power supply unit 27 may not include the battery 31.

In the above embodiment, the portable printer 1 is adopted as the information processing apparatus of the present disclosure. However, the present disclosure is not limited thereto. For example, the information processing apparatus of the present disclosure may also be a stationary printer, not the portable type, and is not limited to the printer and may also be a copy device, a fax device or a scanner device. The information processing apparatus of the present disclosure may be a complex machine having a plurality of functions. For example, the information processing apparatus of the present disclosure may include a FAX communication unit which transmits and receives FAX data to and from another facsimile device via a phone line. The information processing apparatus of the present disclosure is not limited to the image forming apparatus including the image forming unit 16 and the image scanning unit 17. For example, as the information processing apparatus, a variety of electronic devices having an interface through which electric power can be supplied, such as a camera and a sewing machine, can be adopted.

What is claimed is:

1. An information processing apparatus comprising:
   a power source;
   an electric power line;
   an interface configured to be connected with the power source via the electric power line, the interface including:
   a first signal line for management regarding electric power supply from the power source via the electric power line; and
   a second signal line different from the first signal line, the second signal line being for data communication with an external device via the interface;
   a detector configured to detect at least one of a voltage value and a current value on the electric power line; and
   a controller configured to transmit warning information to the external device via the first signal line of the interface, in a case where a detection value of the detector indicates an abnormal value while electric power is supplied to the external device via the interface, wherein the first signal line is provided to decide what electric power role is set for the information processing apparatus, the electric power role is either a source that is an electric power role for supplying electric power or a sink that is an electric power role for receiving electric power, and in a state where the electric power role of the information processing apparatus is set to the source, the controller is configured to transmit the warning information to the external device set to the sink as an electric power role of the external device, in the case where the detection value of the detector indicates the abnormal value; and wherein the controller is configured to transmit, as the warning information, information indicating that electric power supplied to the external device via the interface is to be restricted, in the transmission of the warning information, and wherein the controller is configured to transmit, as the warning information, information indicating a grace period of time to start restriction of electric power supplied to the external device via the interface, in the transmission of the warning information.

2. The information processing apparatus according to claim 1, wherein the warning information is information of a message that complies with USB PD (USB Power Delivery) standards, the interface is a USB (Universal Serial Bus) interface, and the first signal line of the interface is a CC signal line.

3. The information processing apparatus according to claim 2, wherein the message is an alert message defined in the USB PD standards.

4. The information processing apparatus according to claim 1, wherein the controller is configured to:

count the grace period of time, in a case where the information indicating the grace period of time to start restriction of electric power supplied to the external device is transmitted as the warning information;

restrict the electric power supplied to the external device in a case where it is determined that the grace period of time has elapsed.

5. The information processing apparatus according to claim 1, wherein the controller is configured to stop a supply of the electric power to the external device, to restrict the electric power to the external device.

6. The information processing apparatus according to claim 1, wherein the controller is configured to stop a supply of the electric power to the external device, to restrict the electric power to the external device.

7. The information processing apparatus according to claim 1, wherein the interface is a USB (Universal Serial Bus) interface.

8. The information processing apparatus according to claim 1, comprising at least one of:

an image forming unit configured to form an image based on image data; and an image scanning unit configured to scan an image of a document.

9. The information processing apparatus according to claim 1, wherein the controller is configured to:

transmit, as the warning information, information indicating a grace period of time to start restriction of electric power supplied to the external device, in a case where a swap request for swapping the electric power roles with the external device is rejected by the external device; and restrict the electric power supplied to the external device, in a case where the swap request is accepted by the external device.

10. An information processing apparatus comprising:

an interface including:

a first signal line for management regarding electric power supply; and a second signal line different from the first signal line, the second signal line being for data communication with an external device via the interface; and a controller configured to execute at least one of prohibition of writing into a storage device and a halt of the storage device in a case where warning information indicating an electric power abnormality of the external device is received from the external device while electric power is received from the external device via the first signal line of the interface, wherein the first signal line is provided to decide what electric power role is set for the information processing apparatus, the electric power role is either a source that is an electric power role for supplying electric power or a sink that is an electric power role for receiving electric power, and in a state where the electric power role of the information processing apparatus is set to the sink, the controller is configured to execute at least one of the prohibition of writing into the storage device and the halt of the storage device, in the case where the warning information is received from the external device set to the source as an electric power role of the external device; and wherein the controller is configured to:

swap electric power roles with the external device, in a case where a swap request for swapping the electric power roles with the external device is received from the external device;

start control for a halt of the storage device before the role swapping;

determine whether the swap of the electric power roles is successful, as a result of the swap of the electric power roles; and restore the storage device, in a case where it is determined as a result of the determination that the swap of the electric power roles is successful.

11. A control method of an information processing apparatus including:

a power source;

an electric power line;

an interface configured to be connected with the power source via the electric power line, the interface including:

a first signal line for management regarding electric power supply from the power source via the electric power line; and a second signal line different from the first signal line, the second signal line being for data communication with an external device via the interface; and a detector configured to detect at least one of a voltage value and a current value on the electric power line, the control method comprising the step of:

transmitting warning information to the external device via the first signal line of the interface, in a case where a detection value of the detector indicates an abnormal value while electric power is supplied to the external device via the interface, wherein the first signal line is provided to decide what electric power role is set for the information processing apparatus, the electric power role is either a source that is an electric power role for supplying electric power or a sink that is an electric power role for receiving electric power, and in a state where the electric power role of the information processing apparatus is set to the source, the warning information is transmitted to the external device set to the sink as an electric power role of the external device, in the case where the detection value of the detector indicates the abnormal value; and wherein the warning information is information indicating that electric power supplied to the external device via the interface is to be restricted, in the transmission of the warning information, and wherein a controller is configured to transmit, as the warning information, information indicating a grace period of time to start restriction of electric power supplied to the external device via the interface, in the transmission of the warning information.

12. A non-transitory computer-readable storage medium storing a computer program, when executed by a computer mounted on an information processing apparatus including:

a power source;

an electric power line;

an interface configured to be connected with the power source via the electric power line, the interface including:

a first signal line for management regarding electric power supply from the power source via the electric power line; and a second signal line different from the first signal line, the second signal line being for data communication with an external device via the interface; and a detector configured to detect at least one of a voltage value and a current value on the electric power line, the computer program being configured to cause the information processing apparatus to:

transmit warning information to the external device via the first signal line of the interface, in a case where a detection value of the detector indicates an abnormal value while electric power is supplied to the external device via the interface, wherein the first signal line is provided to decide what electric power role is set for the information processing apparatus, the electric power role is either a source that is an electric power role for supplying electric power or a sink that is an electric power role for receiving electric power, and in a state where the electric power role of the information processing apparatus is set to the source, the warning information is transmitted to the external device set to the sink as an electric power role of the external device, in the case where the detection value of the detector indicates the abnormal value; and wherein the warning information is information indicating that electric power supplied to the external device via the interface is to be restricted, in the transmission of the warning information, and wherein a controller is configured to transmit, as the warning information, information indicating a grace period of time to start restriction of electric power supplied to the external device via the interface, in the transmission of the warning information.

13. An information processing apparatus comprising:

a power source;

an electric power line;

an interface configured to be connected with the power source via the electric power line, the interface including:

a first signal line for management regarding electric power supply from the power source via the electric power line; and a second signal line different from the first signal line, the second signal line being for data communication with an external device via the interface;

a detector configured to detect at least one of a voltage value and a current value on the electric power line; and a controller configured to transmit warning information to the external device via the second signal line of the interface, in a case where a detection value of the detector indicates an abnormal value while electric power is supplied to the external device via the interface, wherein the first signal line is provided to decide what electric power role is set for the information processing apparatus, the electric power role is either a source that is an electric power role for supplying electric power or a sink that is an electric power role for receiving electric power, and in a state where the electric power role of the information processing apparatus is set to the source, the controller is configured to transmit the warning information to the external device set to the sink as an electric power role of the external device, in the case where the detection value of the detector indicates the abnormal value; and wherein the controller is configured to transmit, as the warning information, information indicating that electric power supplied to the external device via the interface is to be restricted, in the transmission of the warning information, and wherein the controller is configured to transmit, as the warning information, information indicating a grace period of time to start restriction of electric power supplied to the external device via the interface, in the transmission of the warning information.

14. The information processing apparatus according to claim 13, wherein the interface is a USB (Universal Serial Bus) interface, and the first signal line of the interface is a CC signal line.

15. A control method of an information processing apparatus including:

a power source;

an electric power line;

an interface configured to be connected with the power source via the electric power line, the interface including:

a first signal line for management regarding electric power supply from the power source via the electric power line; and a second signal line different from the first signal line, the second signal line being for data communication with an external device via the interface;

a detector configured to detect at least one of a voltage value and a current value on the electric power line; and the control method comprising the step of:
  transmitting warning information to the external device via the second signal line of the interface, in a case where a detection value of the detector indicates an abnormal value while electric power is supplied to the external device via the interface,
wherein the first signal line is provided to decide what electric power role is set for the information processing apparatus,
the electric power role is either a source that is an electric power role for supplying electric power or a sink that is an electric power role for receiving electric power, and
in a state where the electric power role of the information processing apparatus is set to the source, the warning information is transmitted to the external device set to the sink as an electric power role of the external device, in the case where the detection value of the detector indicates the abnormal value; and
wherein the warning information is information indicating that electric power supplied to the external device via the interface is to be restricted, in the transmission of the warning information, and
wherein a controller is configured to transmit, as the warning information, information indicating a grace period of time to start restriction of electric power supplied to the external device via the interface, in the transmission of the warning information.

16. A non-transitory computer-readable storage medium storing a computer program, when executed by a computer mounted on an information processing apparatus including:
  a power source;
  an electric power line;
  an interface configured to be connected with the power source via the electric power line, the interface including:
    a first signal line for management regarding electric power supply from the power source via the electric power line; and
    a second signal line different from the first signal line, the second signal line being for data communication with an external device via the interface;
  a detector configured to detect at least one of a voltage value and a current value on the electric power line; and
  the computer program being configured to cause the information processing apparatus to:
    transmit warning information to the external device via the second signal line of the interface, in a case where a detection value of the detector indicates an abnormal value while electric power is supplied to the external device via the interface,
wherein the first signal line is provided to decide what electric power role is set for the information processing apparatus,
the electric power role is either a source that is an electric power role for supplying electric power or a sink that is an electric power role for receiving electric power, and
in a state where the electric power role of the information processing apparatus is set to the source, the warning information is transmitted to the external device set to the sink as an electric power role of the external device, in the case where the detection value of the detector indicates the abnormal value; and
wherein the warning information is information indicating that electric power supplied to the external device via the interface is to be restricted, in the transmission of the warning information, and
wherein a controller is configured to transmit, as the warning information, information indicating a grace period of time to start restriction of electric power supplied to the external device via the interface, in the transmission of the warning information.

* * * * *